United States Patent
Beri

(10) Patent No.: US 11,182,955 B1
(45) Date of Patent: Nov. 23, 2021

(54) UTILIZING DYNAMIC FILTERING TO ADAPTIVELY GENERATE CONTROL POINTS OF A VECTOR OBJECT FOR DISPLAY IN A GRAPHICAL USER INTERFACE

(71) Applicant: Adobe Inc., San Jose, CA (US)

(72) Inventor: Tarun Beri, Ludhiana (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/080,057

(22) Filed: Oct. 26, 2020

(51) Int. Cl.
*G06T 17/10* (2006.01)
*G06T 15/40* (2011.01)

(52) U.S. Cl.
CPC ............ *G06T 17/10* (2013.01); *G06T 15/405* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 6,597,368 B1* | 7/2003 | Arai | ........................ | G06T 13/20 345/420 |
| 2013/0088497 A1* | 4/2013 | Dilorenzo | ............ | G06T 15/005 345/473 |
| 2020/0098086 A1* | 3/2020 | Peterson | ................ | G06T 3/0093 |
| 2020/0273147 A1* | 8/2020 | Kamal | .................... | G06K 9/036 |

OTHER PUBLICATIONS

Yates, Ian; envatotuts+; How-To Tutorials; "Illustrator's Pen Tool: The Comprehensive Guide"; May 25, 2020; https://design.tutsplus.com/tutorials/illustrators-pen-tool-the-comprehensive-guide--vector-141#:~:text=How%20to%20Set%20Up%20Different,Preferences%20%3E%20Selection%20%26%20Anchor%20Display.

* cited by examiner

*Primary Examiner* — Nurun N Flora
(74) *Attorney, Agent, or Firm* — Keller Jolley Preece

(57) ABSTRACT

The present disclosure relates to systems, non-transitory computer-readable media, and methods that utilize adaptive, real-time filtration for identifying and providing on-screen control points within a digital canvas for modifying vector objects. In particular, the disclosed systems can generate bounding shapes for control points of a vector object. Based on positions and control orders of the bounding shapes, the disclosed systems can generate a three-dimensional data structure for selectively determining obscurity metrics for control points. For example, the disclosed systems selectively determine obscurity metrics by traversing root and/or child nodes of the three-dimensional data structure that correspond to overlapping bounding shapes of certain control orders. Based the obscurity metrics for the control points satisfying an obscurity threshold, the disclosed systems can provide a subset of the control points for display within the digital canvas (or else dynamically hide or destroy control points failing to satisfy the obscurity threshold).

20 Claims, 11 Drawing Sheets

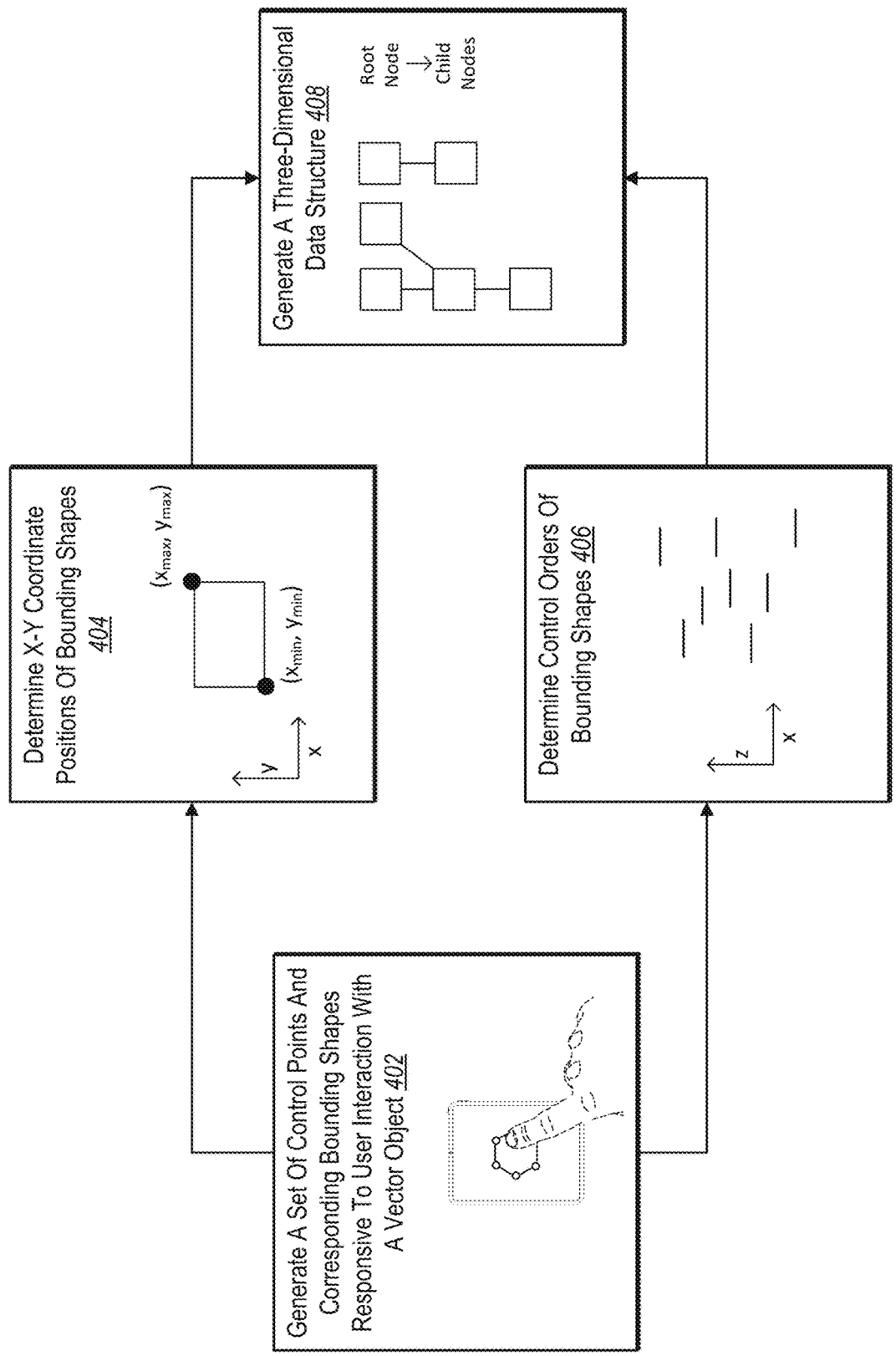

400% Zoom Level

200% Zoom Level

UTILIZING DYNAMIC FILTERING TO ADAPTIVELY GENERATE CONTROL POINTS OF A VECTOR OBJECT FOR DISPLAY IN A GRAPHICAL USER INTERFACE

BACKGROUND

Recent advancements in hardware and software platforms have led to a variety of improvements in computer-implemented digital image editing systems. For example, conventional image editing systems can now perform a variety of complex image editing processes based on various user inputs on tablets, smartphones, and/or desktop client devices. To illustrate, conventional digital image editing systems can generate, modify, and transform vector design objects within a digital canvas based on haptic input with mobile devices. Despite these recent advances, a number of problems continue to plague conventional image editing systems including inefficient memory consumption, decreased rendering speed, and reduced user interface accessibility.

BRIEF SUMMARY

Embodiments of the present disclosure provide benefits and/or solve one or more of the foregoing or other problems in the art with systems, non-transitory computer-readable media, and methods that utilize adaptive, real-time filtration for identifying and providing on-screen control points within a digital canvas for modifying vector objects. In particular, in one or more embodiments, the disclosed systems automatically track and manage the access potential of application created control points and excludes (e.g., defers creation or dynamically destroys/re-creates) control points that are obscured. In some embodiments, as the on-screen environment changes (e.g., the canvas is zoomed or a control point is moved), the disclosed systems re-evaluate a focused impact area and efficiently update the status of affected control points. For example, in one or more implementations the disclosed systems utilize a three-dimensional data structure (e.g., an r-tree) to store and analyze spatial and control order dimensions of bounding shapes for different control points within a digital canvas. By analyzing the three-dimensional data structure, in one or more embodiments the disclosed systems efficiently identify obscurity metrics for individual control points and dynamically filter those control points that fail to satisfy an obscurity threshold. In this manner, the disclosed systems can provide control points that remain identifiable and accessible within a user interface. In addition, as established through experimentation, the disclosed systems can boost application usability, improve performance gain by up to ten percent, and significantly reduce memory consumption.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 4A-4B illustrate a control point filtering system utilizing a three-dimensional data structure to surface a subset of control points and exclude an additional subset of control points in accordance with one or more embodiments.

DETAILED DESCRIPTION

Figure 1B:
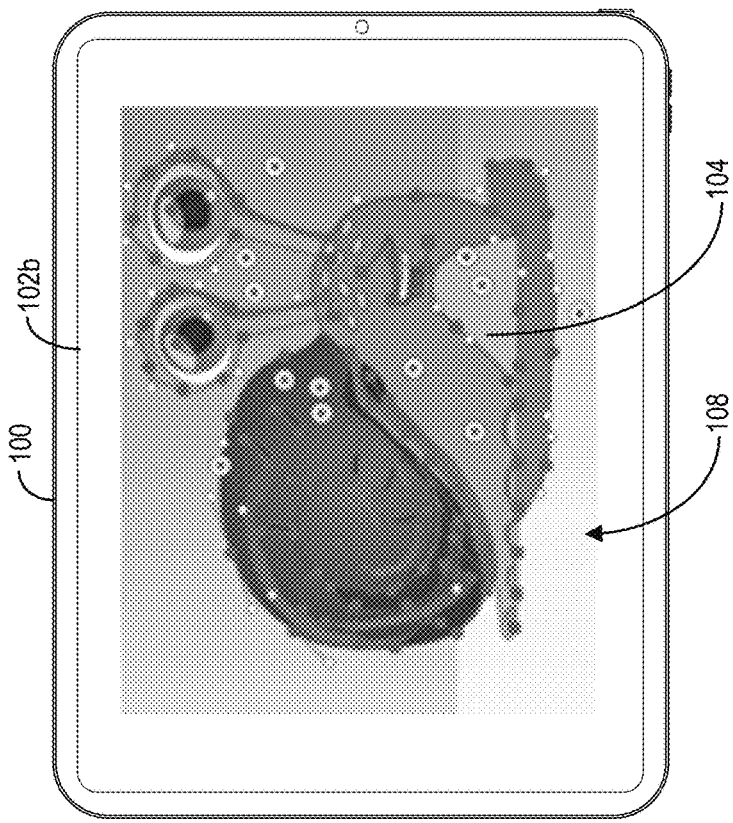
FIG. 1B illustrates a control point filtering system providing a vector object and control points for display within a user interface of a client device in accordance with one or more embodiments.

One or more embodiments described herein include a control point filtering system that efficiently identifies and provides control points for vector objects within a digital canvas utilizing a real-time filtration approach that improves accessibility and reduces obscurity of individual control points. In particular, in some embodiments the control point filtering system improves efficiency and reduces clutter on-screen by determining a fraction of each control point obscured by other control points (e.g., an obscurity metric). For example, the control point filtering system dynamically excludes (e.g., hides or destroys) and provides (e.g., reveals or creates) control points based on these obscurity metrics relative to an obscurity threshold. In some embodiments, the control point filtering system utilizes a three-dimensional data structure (e.g., an r-tree) that maintains bounding shapes of on-screen control points (e.g., x-dimension and y-dimension position coordinates as well as a control order reflecting a z-dimension). For instance, the control point filtering system utilizes this three-dimensional data structure to efficiently determine obscurity metrics for individual control points by analyzing a bounding shape for each control point and subtracting overlapping areas of bounding shapes with higher control orders.

In addition, in some embodiments the disclosed systems utilize a variety of efficiency optimizations to improve performance and response time. For example, the control point filtering system utilizes the three-dimensional data structure to stream-line analysis of control points (e.g., avoid analysis of lower control orders within an r-tree), cache unobscured shapes to avoid reprocessing of control point bounding shapes, and implement batch processing of control point groups. Accordingly, the control point filtering system can improve accessibility of control points within a digital design canvas while improving computer performance, even in circumstances involving high-density control points within a digital canvas.

As mentioned above, in some embodiments the control point filtering system generates bounding shapes for control points. For example, the control point filtering system identifies Bezier anchor points, digital handles, or roundedness controls within a digital canvas and assigns bounding shapes to each of the control points. In some embodiments, the control point filtering system utilizes bounding rectangles having a pre-determined size and also centers the bounding rectangles at the location of each corresponding control point. The control point filtering system can utilize a variety of bounding shapes (e.g., squares, triangles, rectangles, ovals) for a variety of different types of control points.

In one or more embodiments the control point filtering system also determines a control order corresponding to the control points/bounding shapes. For example, the control point filtering system determines an assigned arrangement of bounding shapes in the z-dimension. The control point filtering system can determine this control order in the z-dimension based on a variety of factors. To illustrate, in some embodiments the control point filtering system determine control order based on the type of control point (e.g., Bezier control points before other handles), based on the order in which the control points were created in the digital canvas, based on a measure of significance (e.g., control points corresponding to larger vectors before control points corresponding to smaller vectors), and/or based on positional arrangement (e.g., control points on the left before control points on the right). According to the assigned arrangement, some bounding shapes lie above other shapes (depth-wise) in the digital canvas.

As mentioned previously, in one or more embodiments, the control point filtering system creates and utilizes a three-dimensional data structure to analyze control points and corresponding bounding shapes. For example, based on the positions and control orders of the bounding shapes, the control point filtering system generates a tree-structure such as an r-tree. Specifically, the control point filtering system populates an r-tree based on the position (e.g., x-coordinates and y-coordinates) and control order (e.g., z-coordinate) of bounding shapes corresponding to individual control points. In certain implementations, the control point filtering system generates the three-dimensional data structure comprising root nodes and child nodes based on positional overlap and control order within the digital canvas. To illustrate, the control point filtering system arranges, as a root node, a bounding shape that at least partially overlaps another bounding shape of a lower control order (e.g., the child node).

In one or more embodiments, the control point filtering system utilizes this three-dimensional architecture to efficiently identify obscurity metrics of control points. For instance, the control point filtering system compares x-y coordinates and control orders of overlapping bounding shapes by accessing and systematically traversing the three-dimensional data structure. For example, the control point filtering system traverses the three-dimensional data structure, identifies overlapping areas of the bounding shapes (e.g., higher order bounding shapes overlap lower order bounding shapes), and subtracts these overlapping areas. In this manner, the control point filtering system subtracts or removes overlapping areas to generate unobscured bounding shapes and then determines a corresponding obscurity metric. In some embodiments, the control point filtering system utilizes the remaining area of unobscured bounding shapes as obscurity metrics for the corresponding control points.

Additionally, in some embodiments, the control point filtering system compares the obscurity metrics to an obscurity threshold to determine which control points to surface or exclude. For instance, the control point filtering system identifies an unobscured bounding shape with an obscurity metric (e.g., three hundred square pixels of unobscured area). The control point filtering system compares this obscurity metric with an obscurity threshold (e.g., two hundred square pixels), determines that the obscurity metric satisfies the obscurity threshold, and surfaces the control point within the digital canvas. In contrast, if the obscurity metric fails to satisfy the obscurity threshold the control point filtering system can exclude the control point from the digital canvas.

The control point filtering system can efficiently and dynamically modify visible control points in response to a variety of changes within a digital canvas. For example, in some embodiments, the control point filtering system dynamically modifies visible control points in response to a drag operation moving a control point from an initial position to an end position. In some embodiments, the control point filtering system efficiently updates the visible control points by limiting its analysis to an impact area of the modified control point. For example, the control point filtering system determines an impact area corresponding to the initial position of the control point and the end position of the control point. The control point filtering system then determines modified control points to surface as a result of the move operation by limiting its analysis to nodes of the three-dimensional data structure within the impact area having a lower control order than the modified control point.

In performing such move operations, in one or more embodiments the control point filtering system further improves efficiency by utilizing a cache of unobscured bounding shapes. For example, the control point filtering system generates a cache reflecting unobscured bounding shapes and then access the cache to efficiently determine what control points to surface. Indeed, as just mentioned, during a move operation the control point filtering system analyzes nodes of lower control orders to determine what control points to surface. Rather than repetitively determine overlap areas and unobscured shapes at these various control orders, in some embodiments the control point filtering system caches unobscured shapes and then directly analyzes the cache to determine obscurity metrics during a move operation.

In addition, in one or more embodiments the control point filtering system also improves efficiency by performing batch operations with regard to determining control points to surface. Indeed, in some embodiments the control point filtering system detects a move operation and then generates a collection of updates in a batch (e.g., at the end of the move operation). Indeed, rather than continuously updating obscurity metrics for bounding shapes as the modified control point slides across the user interface, the batch-processing approach allows the control point filtering system to conserve computational resources (e.g., by deferring obscurity metric updates until after the drag process is complete and processing only the affected control points in a batch).

In addition to move operations, in one or more embodiments the control point filtering system also dynamically surfaces control points in response to global modifications, such as zoom operations or pan operations. For example, in detecting a zoom operation to change a zoom level from 200% to 400%, the control point filtering system determines obscurity metrics for a set of control points based on the new zoom level. Based on the obscurity metrics for the set of control points, the control point filtering system in one or more embodiments surfaces an increased number of control points for the new zoom level at 400% than previously shown in the digital canvas at the 200% zoom level.

As briefly mentioned above, a number of problems exist with conventional image editing systems, particularly with regard to memory consumption, rendering speed, and interface accessibility/efficiency. For example, conventional image editing systems consume excessive amounts of computer resources (e.g., processing power, memory, etc.). Indeed, conventional systems often process and reveal all control points within a digital canvas or graphical user interface, which results in utilization of excessive computer resources in generating and modifying vector objects within digital design documents. This problem is only exacerbated by the increasingly complex artworks generated by digital designers and corresponding applications. Indeed, digital design documents often include thousands upon thousands of control points, each requiring significant processing resources to analyze and reveal. Furthermore, many computing devices implementing conventional systems (e.g., mobile devices, such as phones and tablets) are significantly constrained with respect to available memory, screen size or other computing resources. Indeed, conventional systems that draw each control point require as many underlying operating system views as drawn control points, which puts significant pressure on system memory and performance.

In addition to increased memory consumption, conventional systems also face significant problems with regard to rendering speed. Indeed, due to the excessive computational resources required to generate each control point of a vector object, conventional systems often take an excessive amount of time to process control points and render a visual representation of the control points and corresponding vector objects. Moreover, in some cases (e.g., for some mobile computing devices, such as phones and tablets), the conventional systems place such a performance strain on computing devices so as to cause application failure, timeouts, unexpected file/closures, etc.

Furthermore, conventional systems also introduce efficiency and accuracy problems because of the inaccessibility of individual control points. By providing all available control points for display, conventional systems cause excessive on-screen clutter and make individual control point difficult to identify and access. For example, conventional systems often decrease accuracy because user interactions cannot uniquely identify individual control points. Accordingly, conventional systems often select and/or modify control points inaccurately. This inaccuracy also results in additional inefficiencies, as conventional systems process unnecessary and excessive user interactions and modifications (e.g., receiving user selection of an improper control point, modifying the improper control point, performing an undo operation on the control point, receiving an additional selection of an additional control point, etc.). These unnecessary interactions and operations exacerbate the already burdensome computing burden imposed by conventional systems.

The foregoing accuracy and efficiency problems are particularly concerning for mobile computing devices, such as phones and tablets that have limited screen space. For example, some conventional systems increase the size of control points for touch-based user interaction via user interfaces on mobile computing devices. Increasing control-point size of a large volume of control points within a limited screen can make the resulting control points nearly unusable.

In attempts to alleviate system and user inefficiencies as a result of reduced accessibility within user interfaces, some conventional systems provide a preferences option which allows the user to select which control options are shown within the digital canvas. However, this approach is both rudimentary and frustrating because the number of user interactions to change preferences back and forth when modifying a vector object is impractical and excessive. Some conventional systems provide preference "hot keys" to help shortcut the number of user interactions for selectively displaying certain types of control points. However, "hot keys" are unavailable for many mobile computing devices. Moreover, both approaches for adjusting preferences fail to adequately address user accessibility because clusters of control points can often include control points of the same kind or type.

Further to the inaccessibility of conventional systems, some conventional systems for non-creative applications in certain web browsers offer an auto-zoom functionality where all control points under an ambiguous touch are presented in a new zoomed view. In the new zoomed view, the conventional system requires the user to provide another user input to disambiguate the intent. However, this kind of solution only makes sense for discrete events (e.g., a click or tap) and only when the number of control points causing the initial ambiguity is limited. Creative applications for more involved user modifications (e.g., continuous events for editing and designing of complex vector objects) thus cannot practically implement this auto-zoom and clarification approach.

The control point filtering system provides several improvements over conventional systems. For example, the control point filtering system can decrease memory consumption relative to conventional systems. To illustrate, rather than generate each control point for a selected vector object, the control point filtering system can selectively provide a filtered subset of control points for display within a digital canvas. For example, the control point filtering system determines obscurity metrics for control points and filters the control points by applying an obscurity threshold. If the obscurity metric relative to the obscurity threshold indicates that a control point is too obscured, the control point filtering system can exclude the control point from the digital canvas. On the other hand, if the obscurity metric indicates that the control point is sufficiently unobscured, the control point filtering system can provide the control point for display within the digital canvas. Thus, unlike conventional systems, the control point filtering system intelligently surfaces only a subset of control points to decrease memory consumption in providing control points for display.

In addition to decreased memory consumption, the control point filtering system can also increase rendering speed of control points. Indeed, by intelligently identifying a subset of control points that satisfy an obscurity threshold, the control point filtering system can render the remaining control points significantly faster. For example, experimental results indicate that the control point filtering system can provide a ten-fold speed improvement for selectively rendering (e.g., displaying) a subset of control points in comparison to conventional systems.

As mentioned above, the control point filtering system can also increase rendering speed by utilizing a cache of unobscured bounding shapes. For example, when determining an obscurity metric for a control point (e.g., in response to modifying the control point), the control point filtering system generates a cache of unobscured bounding shapes. Rather than re-process bounding shapes already computed, in certain implementations the control point filtering system accesses the cache to obtain the overlapping unobscured bounding shapes of higher control orders. In so doing, the control point filtering system avoids time-consuming computational processes for repeatedly determining obscurity metrics for one or more control points.

In addition, the control point filtering system can also improve efficiency and accuracy by providing increased accessibility to individual control points. By selectively providing a subset of control points filtered according to an obscurity metric, the control point filtering system can reduce clutter and improve the accuracy of user selections and interactions. This enhanced accuracy also improves system efficiency by decreasing the number of user interactions needed to modify control points of a vector object. For example, because the control point filtering system provides a more stream-lined representation of control points, the control point filtering system circumvents repeated processes of conventional systems to disambiguate user interactions.

Figure 1A:
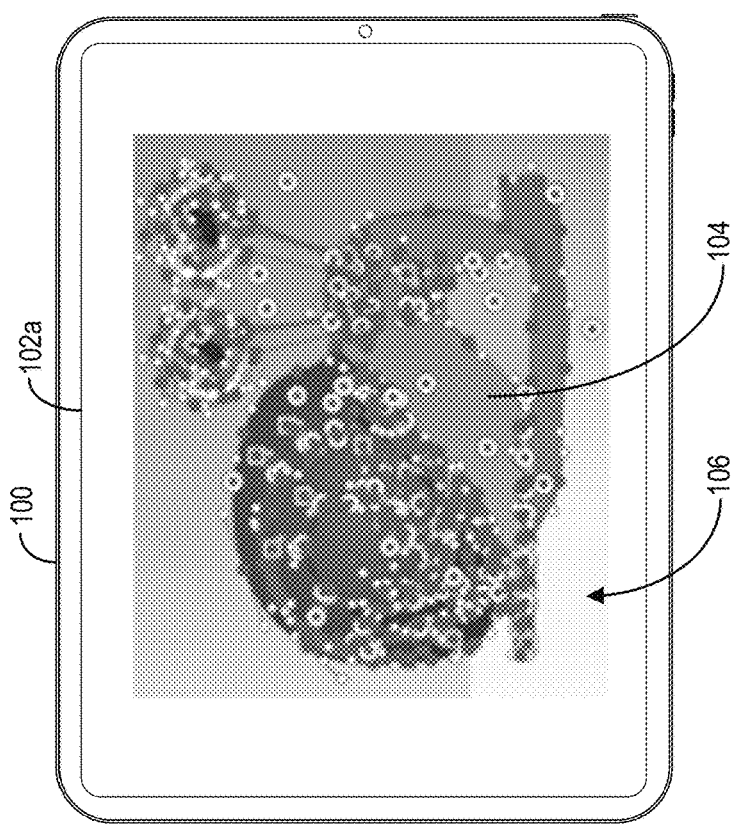
FIG. 1A illustrates a client device displaying, within a user interface, a vector object and corresponding control points according to a conventional system.

The foregoing paragraphs establish a number of improvements provided by the control point filtering system relative to conventional systems. FIGS. 1A and 1B show many of these improvements with respect to an illustrative example. Specifically, FIG. 1A illustrates a client device 100 displaying, within a user interface 102a, a vector object 104 according to a conventional system. In contrast, FIG. 1B illustrates an example implementation of the control point filtering system on the same client device 100 displaying, within a user interface 102b, the same vector object 104 in accordance with one or more embodiments of the present disclosure.

As shown in FIG. 1A, the conventional system generates the control points 106 for display. Specifically, the control points 106 include all control points corresponding to the vector object 104 that falls within the user interface 102a. Because the number of control points is relatively high for the complex vector object 104, the control points 106 include a significant amount of overlap within the user interface 102a. This heavy overlap makes user selection of a specific control point a difficult, if not a practically impossible task. Thus, in addition to the increased processing overhead for rendering so many control points, FIG. 1A specifically illustrates that the control points 106 are largely inaccessible (e.g., via a touch user input) on the client device 100. That is, many of the control points 106 are visually indistinguishable from neighboring or overlapping control points. Additionally, given the size of the human finger relative to the size and amount of overlap of the control points 106, the conventional system presents the control points 106 for display in a way that effectively precludes haptic input as a user interface tool for control-point selection. For instance, in response to a touch user input attempting to select one of the control points 106 in FIG. 1A, the conventional system may ambiguously select a dozen or more control points.

In contrast, FIG. 1B illustrates the control point filtering system generating a filtered subset of control points 108 for display for the vector object 104 in accordance with one or more embodiments. As shown, the filtered subset of control points 108 comprises a limited subset of the control points 106 (e.g., a subset of points that are less obscured by other control points). By selectively providing the filtered subset of control points 108, the control point filtering system can more quickly render the filtered subset of control points 108. Additionally, by selectively providing the filtered subset of control points 108, the control point filtering system in one or more embodiments consumes less memory than required for providing the control points 106.

Furthermore, in contrast to the control points 106 in FIG. 1A, the filtered subset of control points 108 are readily accessible. For example, each of the filtered subset of control points 108 are visually distinguishable from one another with increased control-point spacing and decreased control-point density. Additionally, the filtered subset of control points 108 are readily selectable via a variety of user inputs (e.g., without inherent ambiguity). By avoiding the inherent ambiguity of conventional systems for touch selections of the filtered subset of control points 108, the control point filtering system increases precision of user selection and efficiency as described above.

Figure 2:
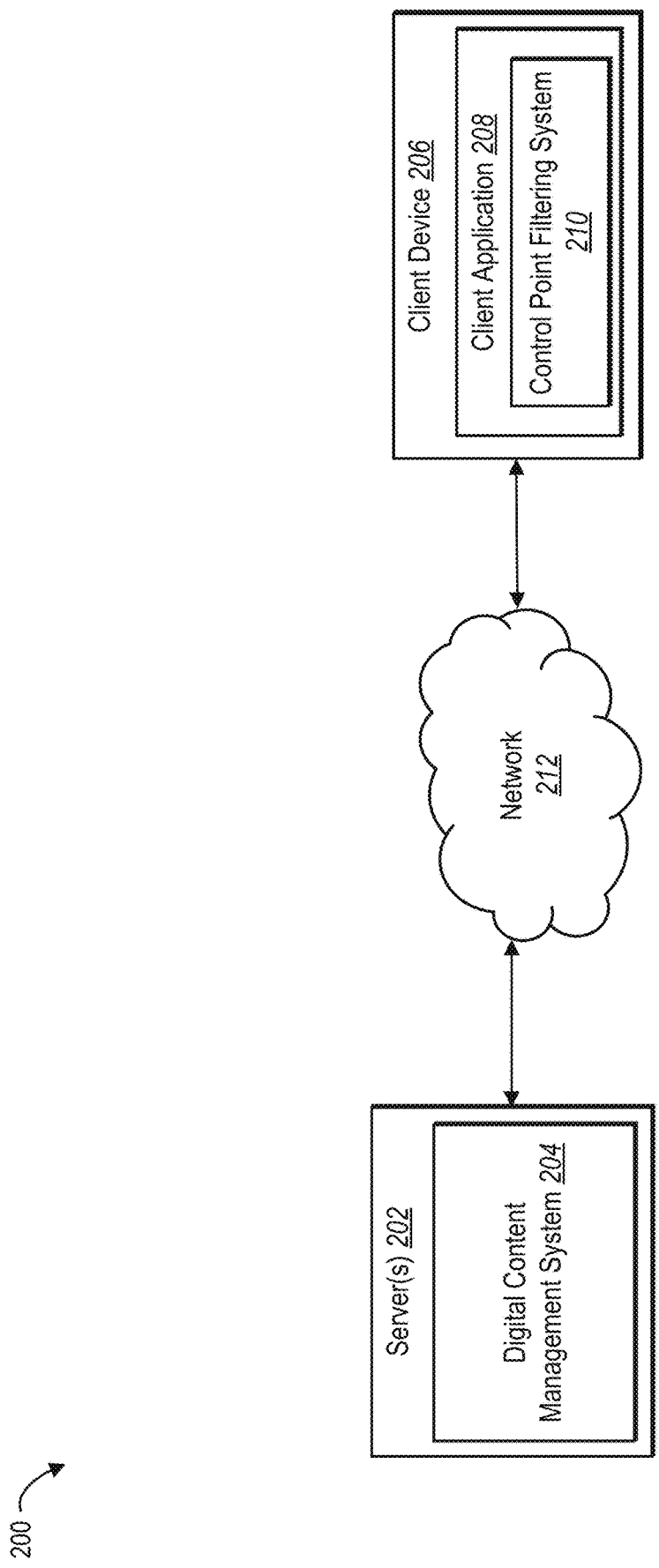
FIG. 2 illustrates a computing system environment for implementing a control point filtering system in accordance with one or more embodiments.

Additional detail will now be provided in relation to additional illustrative figures portraying example embodiments and implementations of the control point filtering system. For example, FIG. 2 illustrates a computing system environment (or "environment") 200 for implementing a control point filtering system 210 in accordance with one or more embodiments. As shown in FIG. 2, the environment 200 includes server(s) 202, a client device 206, and a network 212. In one or more embodiments, each of the components of the environment 200 communicate (or are at least configured to communicate) via the network 212. Example networks are discussed in more detail below in relation to FIG. 10.

As shown in FIG. 2, the environment 200 includes the client device 206. The client device 206 in one or more implementations includes one of a variety of computing devices, including a smartphone, tablet, smart television, desktop computer, laptop computer, virtual reality device, augmented reality device, or other computing device as described in relation to FIG. 10. Although FIG. 2 illustrates a single client device 206, in some embodiments the environment 200 includes multiple client devices 206. The client device 206 in these or other embodiments communicates with the server(s) 202 via the network 212. For example, the client device 206 receives user input and provides information pertaining to the user input (e.g., that relates to accessing, modifying, sharing, or storing a vector object) to the server(s) 202.

As shown, the client device 206 includes a corresponding client application 208. In particular, the client application 208 in one or more implementations comprises a web application, a native application installed on the client device 206 (e.g., a mobile application, a desktop application, etc.), or a cloud-based application where part of the functionality is performed by the server(s) 202. The client application 208 in some embodiments presents or displays information to a user associated with the client device 206, including control points for interacting with a vector object. For example, the user in one or more implementations interacts with the client application 208 via a user interface of the client device 206 to provide user input to modify a control point displayed on a digital canvas.

In certain implementations, the client device 206, via the client application 208, generates, stores, receives, transmits, and/or executes electronic data, such as executable instructions for generating bounding shapes for control points of a vector object and/or generating a three-dimensional data structure comprising positions and control orders of the bounding shapes. Additionally or alternatively, the executable instructions in one or more embodiments relate to determining obscurity metrics for the control points and/or filtering the obscurity metrics according to an obscurity threshold to provide a subset of control points for display. In this manner, the client application 208 selectively generates device-optimized control points in one or more implementations. These and other aspects of the client application 208 implementing the control point filtering system 210 are described in more detail below in relation to the subsequent figures.

As further illustrated in FIG. 2, the environment 200 includes the server(s) 202. In some embodiments, the server(s) 202 comprises a content server and/or a data collection server. Additionally or alternatively, the server(s) 202 comprise an application server, a communication server, a web-hosting server, a social networking server, or a digital content management server.

Moreover, as shown in FIG. 2, the server(s) 202 in certain embodiments implement a digital content management system 204 that manages digital files (e.g., vector-object files). For example, in one or more embodiments, the digital content management system 204 receives, transmits, organizes, stores, updates, and/or recommends vector objects to/from the client device 206. For instance, in certain implementations, the digital content management system 204 comprises a data store of vector objects (or template vector objects) from which the client device 206 selects for modifying via the client application 208.

Although FIG. 2 depicts the control point filtering system 210 located on the client device 206, in some embodiments, the control point filtering system 210 is implemented by one or more other components of the environment 200 (e.g., by being located entirely or in part at one or more of the other components). For example, the server(s) 202 and/or a third-party device implement the control point filtering system 210 in one or more embodiments.

In some embodiments, though not illustrated in FIG. 2, the environment 200 has a different arrangement of components and/or has a different number or set of components altogether. For example, in certain embodiments, the environment 200 includes a third-party server (e.g., for storing vector objects or other data). As another example, the client device 206 communicates directly with the server(s) 202, bypassing the network 212.

Figure 3:
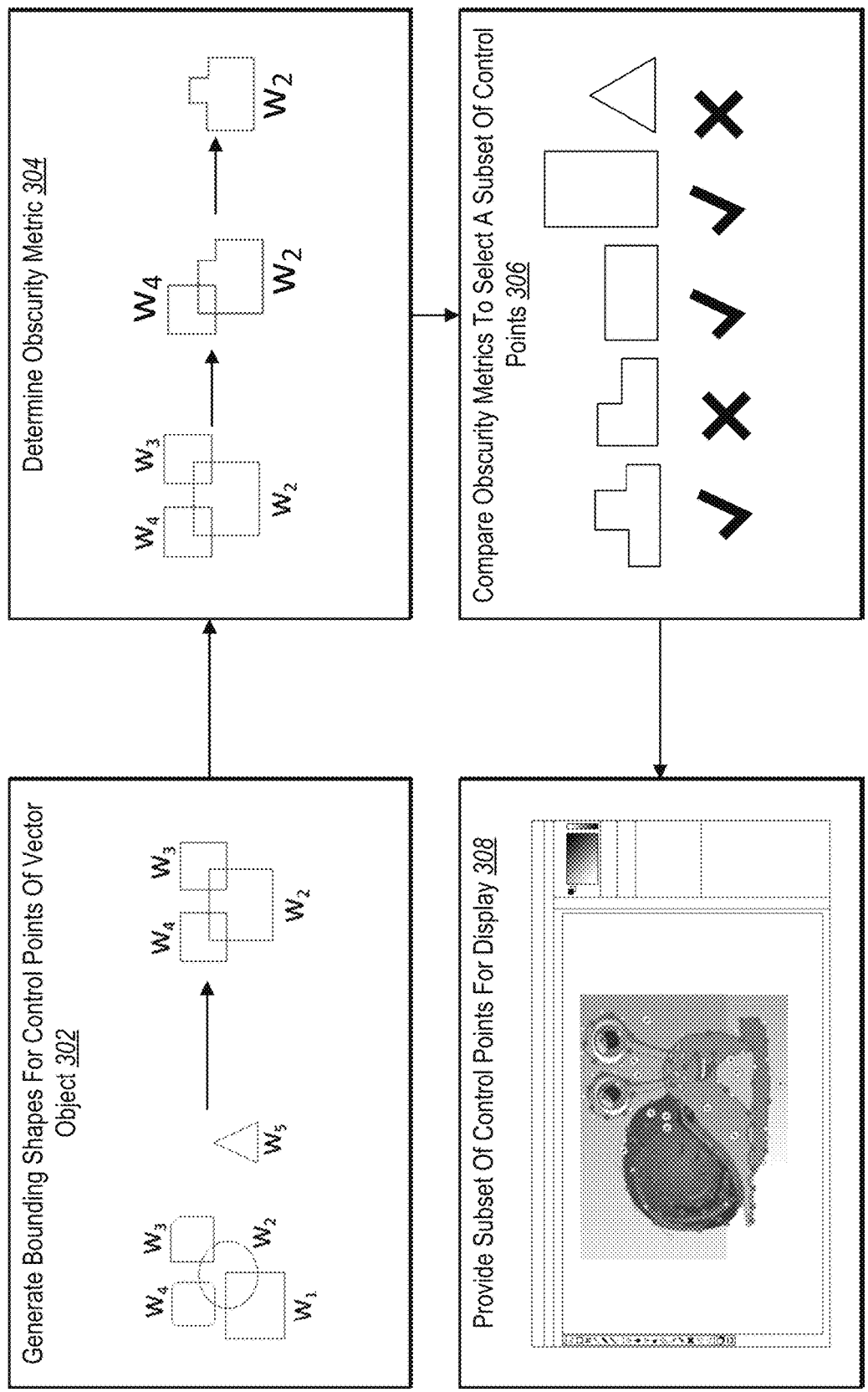
FIG. 3 illustrates a schematic diagram of a control point filtering system determining a subset of control points to provide for display in accordance with one or more embodiments.

As mentioned above, the control point filtering system 210 improves system and user efficiencies for interacting with vector objects within a digital canvas by selectively providing a subset of control points for display as opposed to each control point. FIG. 3 illustrates a schematic diagram of the control point filtering system 210 determining a subset of control points to provide for display in accordance with one or more embodiments. Specifically, FIG. 3 illustrates the control point filtering system 210 performing acts 302-308 in identifying a subset of control points to provide for display.

As shown in FIG. 3, the control point filtering system 210 performs the act 302 of generating bounding shapes for control points of a vector object. In one or more embodiments, a bounding shape includes a configurable form, outline, or figure that encompasses a control point. In particular embodiments, a bounding shape includes a rectangle, square, or other polygon sized and shaped to encompass a control point. For example, as shown in act 302 of FIG. 3, the control point filtering system 210 generates a corresponding rectangular bounding shape for each of the control points $W_2$ (a circle), $W_3$ (a rectangle with a clipped corner) and $W_4$ (a square with rounded corners).

Although FIG. 3 illustrates control points (e.g., control points $W_1$-$W_5$) as mere shapes, in these or other embodiments, control points include selectable elements for interacting with or modifying a vector object (e.g., a vector graphic associated with a graphic file format, such as scalable vector graphics or portable document format). Examples of control points include anchor points (e.g., a corner anchor, a Bézier curve anchor, etc.), digital handles (e.g., directional controls) associated with anchor points, and roundedness controls (e.g., for smoothing curves).

To generate bounding shapes for the control points of a vector object (at the act 302), in one or more embodiments the control point filtering system 210 applies a bounding shape centered over a control point. For example, in some embodiments the control point filtering system 304 generate a bounding shape as the tightest fitting rectangle over a control point (e.g., over the existing shape of the control point to be illustrated in the digital canvas). In certain implementations, the bounding shape is a predetermined size (e.g., based on a current size ratio of control points relative to a zoom level). In some embodiments, the control point filtering system 210 starts with a smaller bounding shape and incrementally increases the size of the bounding shape until the bounding shape fully encompasses the control point. In alternative embodiments, the control point filtering system 210 starts with a larger bounding shape and incrementally decreases the size of the bounding shape until one or more sides of the bounding shape are within a threshold distance to the control point (e.g., to maintain a spatial buffer around the control point).

As shown in FIG. 3, the control point filtering system 210 also performs the act 304 of determining an obscurity metric. Indeed, to determine whether the control point filtering system 210 provides the control point $W_2$ for display, the control point filtering system 210 determines an obscurity metric for the control point $W_2$. In these or other embodiments, an obscurity metric for a control point is a quantitative indicator reflecting how much of a bounding shape for the control point is obscured or unobscured by another bounding shape (e.g., how much of a bounding shape is blocked or unblocked by control points having a higher control order). In particular embodiments, an obscurity metric comprises an area value for an unobscured bounding shape (e.g., the net resulting bounding shape after subtracting or removing portions obscured by one or more other bounding shapes having a higher control order).

For instance, with regard to the example illustrated in FIG. 3, the control point filtering system 210 determines that the control point $W_2$ overlaps with the control points $W_1$, $W_3$, and $W_4$. However, only control points $W_3$ and $W_4$ have higher control orders than $W_2$. Accordingly, the control point filtering system 210 determines an obscurity metric for the control point $W_2$ by subtracting the overlapping area of control point $W_3$ and the overlapping area of control point $W_4$. The control point filtering system 210 can utilize the remaining area (e.g., the remaining number of square pixels) for the unobscured bounding shape for the control point $W_2$ after removing the obscured portions overlapped by the bounding shapes for the control points $W_3$-$W_4$ as the obscurity metric.

Although the foregoing example utilizes the remaining area of an unobscured shape as the obscurity metric, the control point filtering system 210 can utilize other measures for the obscurity metric. For example, in some embodiments, the control point filtering system 210 utilizes the overlapping area (e.g., the overlapping pixels or the area removed) as the obscurity metric. Similarly, in some embodiments the control point filtering system 210 can apply a modifier or normalizer to an area to generate the obscurity metric (e.g., a percentage of remaining area).

As shown in FIG. 3, the control point filtering system 210 also performs the act 306 of comparing obscurity metrics to select a subset of control points. Indeed, based on the determined obscurity metric at the act 304, at the act 306 the control point filtering system 210 compares obscurity metrics to select a subset of control points for display. In particular embodiments, the control point filtering system 210 analyzes one or more obscurity metrics to determine whether a control point would be too obscured if provided for display. For example, if an obscurity metric is too small, the control point filtering system 210 determines not to select the corresponding control point because too little of the control point will be unobscured from view (or in other terms, because too much of the control point will be obscured). Contrary, if an obscurity metric is sufficiently large (e.g., relative to an obscurity threshold described below in relation to act 416 of FIG. 4B), the control point filtering system 210 in some embodiments selects the corresponding control point because a sufficient amount of the control point will be unobscured.

In some embodiments, the control point filtering system 210 selects a certain number or percentage of control points. For example, the control point filtering system 210 can select the top 50 control points (e.g., the 50 control points having the largest obscurity metric). In one or more embodiments, the control point filtering system 210 selects the top 20% of control points (e.g., the control points having the top 20% of obscurity metrics). As described in greater detail below, in some embodiments, the control point filtering system 210 selects control points that satisfy an obscurity threshold. By intelligently selecting a subset of control points for display, the control point filtering system 210 in one or more embodiments increases device performance and ensures that control points do not clutter a user interface for interacting with a vector object.

As further illustrated in FIG. 3, the control point filtering system also performs the act 308 of providing a subset of control points for display. In particular, the control point filtering system 210 provides the selected subset of control points for display in relation to a vector object on a digital canvas depicted in a user interface. In particular, as shown, the subset of control points within the digital canvas are more stream-lined and easily accessible. In these or other embodiments, a digital canvas includes a digital file or digital design space for portraying/modifying digital media. In particular, a digital canvas can include a digital file defining a digital media item or a digital design space (e.g., a user interface) for creating/displaying a digital media item. To illustrate, in utilizing a software application for generating a digital image comprising a variety of vector objects, a digital canvas can include the file defining the vector objects being designed (e.g., an AI file) within the software application. A digital canvas can also include the digital design space (e.g., the user interface) utilized to create and/or display the vector objects within the software application.

Figure 4B:
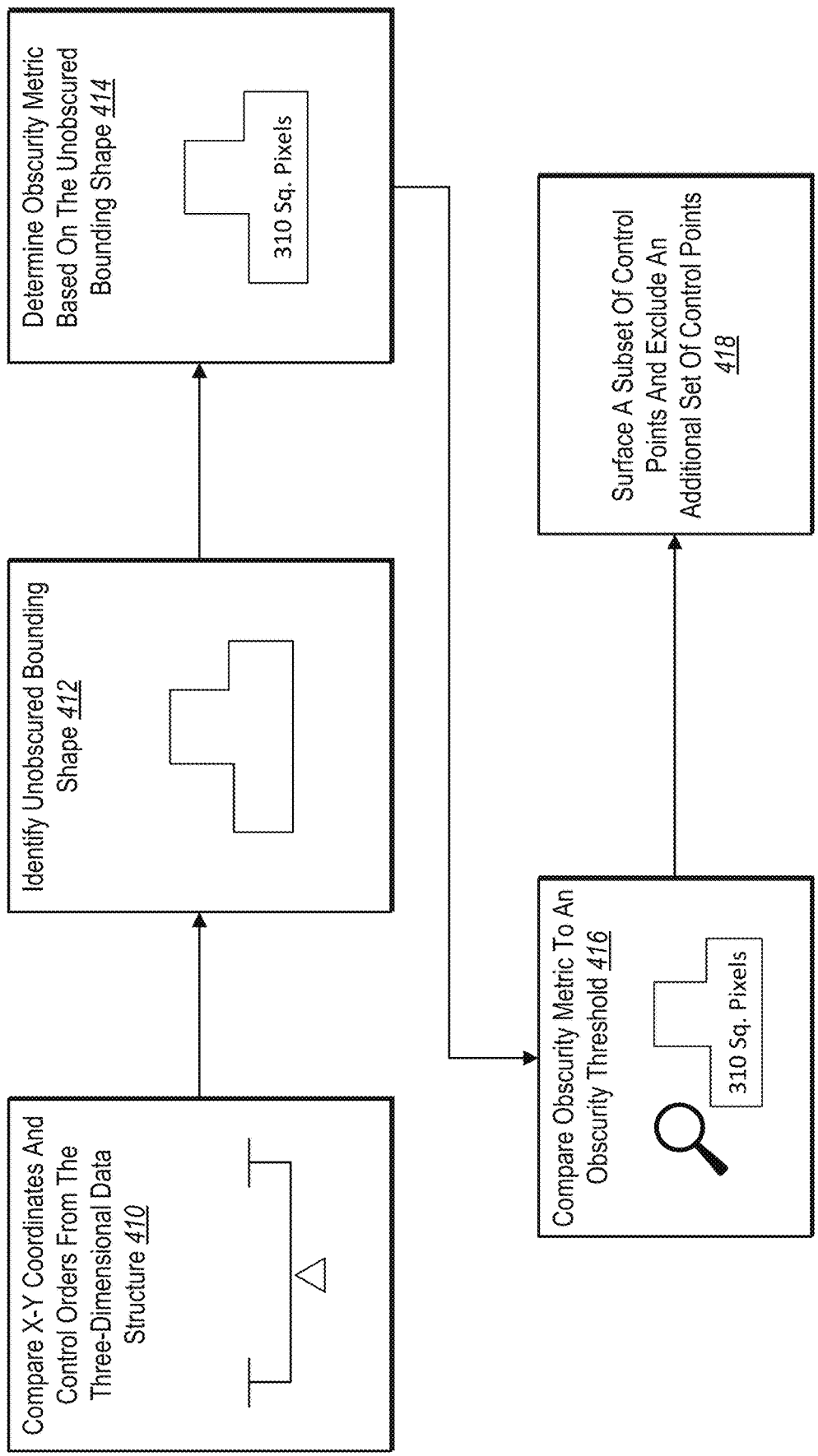

As mentioned above, the control point filtering system 210 can intelligently select a subset of control points for display to improve device performance and user interactions at a user interface. FIGS. 4A-4B illustrate the control point filtering system 210 utilizing a three-dimensional data structure to surface a subset of control points and exclude an additional subset of control points in accordance with one or more embodiments. As shown in FIG. 4A, the control point filtering system 210 performs an act 402 of generating a set of control points and corresponding bounding shapes in response to user interaction with a vector object. In some embodiments, the user interaction comprises application of a selection tool that selects an entirety of the vector object. In other embodiments, the user interaction comprises application of a selection tool configured to select a desired portion of the vector object (e.g., a marquee selection tool).

From the user selection, the control point filtering system 210 identifies/generates a set of control points that correspond to the selected portion of the vector object. For example, the control point filtering system 210 identifies control points associated with a selected line segment, path, curve, outline, corner, etc. Additionally or alternatively, the control point filtering system 210 identifies control points only for portions of the vector object residing within the physical boundaries of the user selection (e.g., a marquee selection box). Further, in some embodiments, the control point filtering system 210 identifies one or more specific types of control points that correspond to the user selection.

From the identified set of control points, the control point filtering system 210 generates bounding shapes (e.g., as described above in relation to the act 302 of FIG. 3). For example, the control point filtering system 210 generates bounding shapes in the form of rectangles that respectively include each control point of the set of control points.

As shown in FIG. 4, the control point filtering system 210 also performs an act 404 of determining x-y coordinate positions of bounding shapes. In particular embodiments, the control point filtering system 210 determines an x-value range and a y-value range (e.g., minimum and maximum x-y values) for each of the bounding shapes generated at the act 402. To do so, the control point filtering system 210 in one or more embodiments analyzes diagonally positioned corners of each bounding shape (e.g., a bottom-left corner and a top-right corner, or a top-left corner and a bottom-right corner). For example, the control point filtering system 210 identifies where these corners are located with respect to a coordinate system (e.g., the same Cartesian plane used to define the vector object, or an arbitrarily defined coordinate system with an origin positioned within the digital canvas).

For bounding shapes besides rectangles, the control point filtering system 210 can utilize a variety of approaches for defining positions of bounding shapes. For example, for a circular bounding shape, the control point filtering system 210 can define coordinates of a circle center together with a radius or diameter of the circle. Similarly, for a triangular bounding shape, the control point filtering system 210 can define coordinates of the vertices of the bounding shape. Each of these positional shapes are described herein as two-dimensional (e.g., two-dimensional coordinates) because they define an area or space in two-dimensional space (x-y space) covered by the bounding shape.

As shown in FIG. 4A, the control point filtering system 210 also performs an act 406 of determining control orders of bounding shapes. In these or other embodiments, a control order indicates how bounding shapes are positionally related to one another in a third dimension (e.g., a z-dimension). In particular embodiments, a control order indicates a depth configuration (e.g., z-dimensional position, arrangement, or assignment) of bounding shapes in a third coordinate plane relative to an x-y coordinate plane defining the vector object. For example, a higher control order indicates a bounding shape is above other bounding shapes in the z-dimension. On the other hand, a lower control order indicates a bounding shape is below other bounding shapes in the z-dimension.

To illustrate, consider the example control points $W_1$-$W_5$ with bounding shapes of corresponding control orders one through five. The bounding shape for the control point $W_5$ has the highest control order (five) and the bounding shape for the control point $W_1$ has the lowest control order (one). In this example, the bounding shape for the control point $W_1$ is below (in the z-dimension) each of the other bounding shapes for the control points $W_2$-$W_5$. Similarly, the bounding shape for the control point $W_5$ is above (in the z-dimension) each of the other bounding shapes for the control points $W_1$-$W_4$.

As used herein "higher" or "lower" control order indicates the relative position along this z-dimension. It will be appreciated that the system can utilize different number arrangements to reflect a higher/lower control order. For example, in a system that uses an ascending control order (such as the previous example), a control order of "1" may be lower than a control order of "2." In a system that uses a descending control order, a control order of "1" may be higher than a control order of "2." Regardless of the particular number designation, a higher control order takes precedence over a lower control order in determining what shapes overlap and obscure other shapes.

To determine the control orders for the bounding shapes at act 406, in one or more embodiments the control point filtering system 210 identifies, for the set of control points, a relative order of creation. In certain implementations, the order of creation leverages an order in which portions of the vector object were created. For example, the control point filtering system 210 assigns lower control orders for bounding shapes of control points in the set of control points associated with an initially created portion of a vector object (e.g., outer line segments). Further, in certain implementations, the control point filtering system 210 assigns higher control orders for bounding shapes of control points in the set of control points associated with a subsequently created portion of the vector object (e.g., inner line segments).

Additionally or alternatively, in some embodiments, the control point filtering system 210 assigns control orders to bounding shapes based on the order in which the control point filtering system 210 identifies the control points responsive to the user interaction detected at act 402. For example, in response to a marquee selection tool moving across a vector object for user selection, the control point filtering system 210 in one or more implementations incrementally identifies additional control points. In response, the control point filtering system 210 in one or more embodiments assigns control orders to bounding shapes in the order in which the control point filtering system 210 created/ identified the control points. On the other hand, in response to deselection of the control points, the control point filtering system 210 in certain implementations resets all control orders back to zero.

Further, in some embodiments, the control point filtering system 210 assigns control orders to bounding shapes based on configurable preferences (e.g., to prioritize showing certain types of control points over others, such as digital handles over anchor points). In this case, the control point filtering system 210 assigns the bounding shapes for preferred control points with higher control orders than bounding shapes for other control points. Still in other embodiments, the control point filtering system 210 arbitrarily assigns control orders to bounding shapes.

In one or more embodiments, the control point filtering system 210 dynamically assigns control orders as additional control points are added or removed (e.g., added or removed to a user selection of control points). For example, the control point filtering system 210 can add new control points by increasing the control orders. For instance, consider a scenario in which the control point filtering system 210 additionally generates control points $W_6$-$W_7$ after removing (e.g., destroying) the control point $W_3$. In this case, the control point filtering system 210 in one or more implementations still assigns the bounding shapes for the control points $W_6$-$W_7$ corresponding control orders "6" and "7" (notwithstanding the control order of "3" is available). In other embodiments, the control point filtering system 210 keeps track of which control orders are currently utilized and instead assigns a new control point the control order of "3."

As shown in FIG. 4, the control point filtering system 210 also performs an act 408 of generating a three-dimensional data structure. In particular, based on the x-y coordinate positions and the control orders determined at the acts 404-406, the control point filtering system 210 generates the three-dimensional data structure. In some embodiments, a three-dimensional data structure includes a data construct for storing spatial data of bounding shapes. In particular embodiments, a three-dimensional data structure comprises the x-y coordinate positions and the control orders of bounding shapes within the digital canvas. Examples of three-dimensional data structures include a tree-type data structure, such as R-trees, K-D trees, occlusion trees, priority R-tree, R* tree, R+ tree, RR* tree, Hilbert R-tree, X-tree, etc. In alternative embodiments, a three-dimensional data structure comprises a linear representation of this multi-dimensional data (e.g., a three-dimensional array).

Further, in some embodiments, the three-dimensional data structure comprises root nodes and child nodes as a physical three-dimensional representation of the bounding shapes within the digital canvas. In one or more implementations, a root node is a parent node with an edge or link to a child node (e.g., a sub-node that is linked to and hierarchically below a parent node). In particular embodiments specific to bounding shapes, a root node at least partially overlaps the x-value and y-value ranges for a child node and comprises a higher control order than the child node. For example, consider the bounding shapes for the control points $W_2$-$W_4$ discussed above in relation to FIG. 3. In this case, the bounding shapes for the control points $W_3$ and $W_4$ have higher control orders than the bounding shape for the control point $W_2$. In addition, the bounding shapes for the control points $W_3$ and $W_4$ both overlap (albeit independently of each other) the bounding shape for the control point $W_2$. Accordingly, the bounding shapes for the control points $W_3$ and $W_4$ are both root nodes to the bounding shape for the control point $W_2$ as a child node.

To generate the three-dimensional data structure at act the 408, the control point filtering system 210 arranges the bounding shapes into root nodes and child nodes based on the x-y coordinate positions and control orders determined at the acts 404-406. The control point filtering system 210 can implement a variety of data structure population methods to do so. For example, in one or more embodiments, the control point filtering system 210 groups the bounding shapes each having at least one instance of overlap with x-value and y-value ranges of another bounding shape. Subsequently, the control point filtering system 210 arranges each group of bounding shapes into a hierarchy of root nodes and child nodes based on control orders.

As another example (in the opposite order), the control point filtering system 210 first arranges the bounding shapes by control order (e.g., in a vertical, top-down approach) where the bounding shapes comprising the highest control orders are at the top and the lowest control orders at the bottom. Subsequently, the control point filtering system 210 generates the appropriate edge connections (e.g., root/child connections) between bounding shapes based on positional overlap of x-value and y-value ranges. Still in other embodiments, the control point filtering system 210 utilizes a combined and/or an alternative approach to the foregoing examples for arranging the bounding shapes into root nodes and child nodes of the three-dimensional data structure.

Regardless of the population method utilized, the control point filtering system 210 can dynamically adjust the three-dimensional data structure in response to user interactions (e.g., selections/deselections) with one or more vector objects. For example, in response to deselecting the vector object, the control point filtering system 210 in one or more embodiments clears the three-dimensional data structure of all x-y coordinates and control orders associated with bounding shapes for prior generated control points. In this manner, the control point filtering system 210 prepares the three-dimensional data structure for a subsequent selection of the vector object and corresponding generation of control points.

Moreover, by arranging the bounding shapes within the three-dimensional data structure based on x-y coordinate positions and control orders, the control point filtering system 210 can increase computational efficiency for implementing computing devices. For example, in determining an obscurity metric for a control point associated with a particular bounding shape as described more below, the control point filtering system 210 need not traverse or query an entirety of the three-dimensional data structure.

To illustrate, as shown in FIG. 4B the control point filtering system 210 performs an act 410 of comparing x-y coordinates and control orders from the three-dimensional data structure. In particular, the control point filtering system 210 leverages the physical representation of bounding shapes in the three-dimensional data structure to selectively identify root nodes and/or child nodes. The control point filtering system 210 utilizes these root nodes and child nodes to efficiently compare x-y coordinates and control orders of bounding shapes. For example, to determine an obscurity metric for a control point associated with a first bounding shape, the control point filtering system 210 accesses the three-dimensional data structure and identifies the first bounding shape within the data structure. The control point filtering system 210 then looks to bounding shapes having higher control orders within the data structure to determine the obscurity metric. Specifically, if the first bounding shape is a child node, the control point filtering system 210 looks to parent nodes identify one or more specific bounding shapes (e.g., a second bounding shape and a third bounding shape) within the three-dimensional data structure.

In one or more embodiments, both the second bounding shape and the third bounding shape overlap the first bounding shape, and both have higher control orders than the first bounding shape. This example is similar to the bounding shapes for the control points $W_3$-$W_4$ relative to the bounding shape for the control point $W_2$ discussed above in relation to FIG. 3. Similarly, in some embodiments, the second bounding shape and the third bounding shape overlap the first bounding shape, but only the second bounding shape has a higher control order than the first bounding shape. That is, the third bounding shape has a lower control order than the first bounding shape. This additional example is similar to the bounding shapes for the control points $W_1$ and $W_3$ relative to the bounding shape for the control point $W_2$ also discussed above in relation to FIG. 3.

Based on the identified bounding shapes from the three-dimensional data structure, the control point filtering system 210 in one or more embodiments determines overlapping areas between bounding shapes of lower control orders and bounding shapes of higher control orders. In one or more embodiments, an overlapping area comprises a portion of a bounding shape that maps to another bounding shape. In particular embodiments, an overlapping area of a bounding shape includes a specific portion of an x-value range and a y-value range for the bounding shape that coincides with another bounding shape (e.g., an overlapping x-value range and an overlapping y-value range). For instance, returning to the example bounding shape for the control point $W_2$, the bounding shape comprises three discrete overlapping areas. The first overlapping area corresponds to the intersecting portion with the bounding shape for the control point $W_3$. The second overlapping area corresponds to the intersecting portion with the bounding shape for the control point $W_4$, and the third overlapping area corresponds to the intersecting portion with the bounding shape for the control point $W_1$. Accordingly, in these or other embodiments, the control point filtering system 210 determines the overlapping areas as corresponding to overlapping x-value ranges and overlapping y-value ranges (e.g., an overlapping rectangle of diagonally defined coordinates, such as ($x_{overlap\_min}$, $y_{overlap\_min}$) and ($x_{overlap\_max}$, $y_{overlap\_max}$)).

As shown in FIG. 4, the control point filtering system 210 also performs an act 412 of identifying an unobscured bounding shape. For example, based on the comparison at the act 410 to identify the relevant bounding shapes and associated overlapping areas, the control point filtering system 210 generates an unobscured bounding shape. To illustrate, the control point generates an unobscured bounding shape by removing the overlapping areas that corresponding to bounding shapes of higher control orders. For instance, consider again the case mentioned above where the bounding shape for the control point $W_2$ comprises three discrete overlapping areas corresponding to bounding shapes for the control points $W_1$, and $W_3$-$W_4$. In certain embodiments, the control point filtering system 210 removes, from the bounding shape for the control point $W_2$, the first and second overlapping areas that correspond to the bounding shapes of higher control orders (e.g., for control points $W_3$-$W_4$). Further to the example, the control point filtering system 210 does not remove, from the bounding shape for the control point $W_2$, the third overlapping area that corresponds to the bounding shape of lower control order (e.g., for control point $W_1$).

In addition, as illustrated in FIG. 4, the control point filtering system 210 also performs an act 414 of determining an obscurity metric for a control point based on the unobscured bounding shape. To determine the obscurity metric, the control point filtering system 210 determines an area value for the unobscured bounding shape. The control point filtering system 210 can utilize a number of different approaches to determine an obscurity metric.

In some embodiments, the control point filtering system 210 at the act 414 performs a difference operation that accounts for the overlapping area removal from an original bounding shape as described above in relation to the act 412. In this case, the control point filtering system 210 determines an overlapping area value by multiplying an x-value range by a y-value range that corresponds to the overlapping area (e.g., $(x_{overlap\_max} - x_{overlap\_min}) * (y_{overlap\_max} - y_{overlap\_min})$). Similarly, the control point filtering system 210 determines an original area value for the original bounding shape (pre-removal of overlapping area(s)) by multiplying an x-value range by a y-value range that corresponds to the original bounding shape (e.g., $(x_{original\_max} - x_{original\_min}) * (y_{original\_max} - y_{original\_min})$). Subsequently, by subtracting the overlapping area value(s) for the overlapping area(s) from the original area value for the original bounding shape, the control point filtering system 210 determines the obscurity metric for the control point associated with the unobscured bounding shape (e.g., 310 square pixels).

In some implementations, multiple higher-order bounding shapes may overlap a common region of a lower-order bounding shape. In such circumstances, the control point filtering system 210 can avoid subtracting the same overlapping region twice. For example, if $W_3$ and $W_4$ both overlap the same area of $W_2$, the control point filtering system 210 can first subtract an overlapping region between $W_4$ and $W_2$ from the area of $W_2$ to generate a first remaining area. The control point filtering system 210 can then subtract an overlapping region between $W_3$ and the first remaining area of $W_2$ to generate a final remaining area. The system can utilize this final remaining area to determine the obscurity metric. It will be appreciated that the particular operations utilized to remove such an overlapping area can vary from embodiment to embodiment. For instance, rather than the operations just described (e.g., multiple subtraction operations), the control point filtering system 210 can determine a combined region of $W_3$ and $W_4$ and then subtract the combined region of $W_3$ and $W_4$ from $W_2$.

In alternative embodiments, the control point filtering system 210 determines the obscurity metric for the control point associated with the unobscured bounding shape without relying on area values for the removed overlapping area(s) or original bounding shape. For example, the control point filtering system 210 in some embodiments counts how many square pixels fit inside the unobscured bounding shape. In another example, the control point filtering system 210 segments (computationally) the unobscured bounding shape into multiple rectangles. By segmenting the unobscured bounding shape, the control point filtering system 210 can utilize a similar method described above for determining area values for discrete rectangles. Subsequently, the control point filtering system 210 in this embodiment combines the area values for the segmented rectangles to determine the obscurity metric for the control point associated with the unobscured bounding shape.

In one or more embodiments, the control point filtering system 210 utilizes the overlapping area(s) themselves to determine the obscurity metric for a control point. In such an embodiment, the control point filtering system 210 does not utilize the unobscured bounding shape or its area to determine the obscurity metric. Rather, the control point filtering system 210 compares the overlapping area(s) of bounding shapes to determine obscurity metrics. Accordingly, a higher obscurity metric represents a larger amount of overlapping area(s) for a bounding shape. Similarly, a lower obscurity metric represents a smaller amount of overlapping area(s) for a bounding shape.

In other embodiments, the control point filtering system 210 determines an obscurity metric by determining a ratio or percentage value for a bounding shape. In some embodiments, the percentage value is a percentage remaining after removing the overlapping area(s) (e.g., an area of the unobscured bounding shape divided by an area of the original bounding shape). In other embodiments, the percentage value is an overlap percentage of the overlapping area(s) relative to the original bounding shape (e.g., an area value for the overlapping area(s) divided by an area value for the original bounding shape). Myriad other ways for determining an obscurity metric are within the scope of the present disclosure.

In addition, as shown in FIG. 4, the control point filtering system 210 also performs an act 416 of comparing the obscurity metric to an obscurity threshold. In these or other embodiments, an obscurity threshold includes a predetermined obscurity metric or range of obscurity metrics. In particular embodiments, an obscurity threshold comprises an obscurity metric value that if the unobscured bounding shape fails to satisfy (e.g., meet or exceed), the control point filtering system 210 determines that the control point associated with the unobscured bounding shape is too obscured for display within a digital canvas. On the other hand, an obscurity threshold comprises an obscurity metric that if the unobscured bounding shape does satisfy, the control point filtering system 210 determines that the control point associated with the unobscured bounding shape is sufficiently unobscured for displaying within the digital canvas. For instance, in some embodiments, the obscurity threshold is a configurable area of pixels, such as fifty square pixels, one hundred square pixels, two hundred square pixels, five hundred square pixels, one thousand square pixels, etc.

For example, as illustrated in FIG. 4, the control point filtering system 210 determines an obscurity metric of 310 square pixels. The control point filtering system 210 compares this obscurity metric to an obscurity threshold (e.g., 200 square pixels). Based on determining that the obscurity metric satisfies the obscurity threshold, the control point filtering system 210 can add the control point to a set of control points to surface via a user interface. Alternatively, based on determining that the obscurity metric fails to satisfy the obscurity threshold, the control point filtering system 210 can add the control point to a set of control points to exclude via a user interface.

Indeed, as shown in FIG. 4B, the control point filtering system 210 performs the act 418 of surfacing a subset of control points and excluding an additional set of control points. In particular, based on the comparison at the act 416, the control point filtering system 210 surfaces a subset of control points that satisfy the obscurity metric and excludes an additional set of control points that do not satisfy the obscurity metric. For instance, based on the control point filtering system 210 determining that the obscurity metric of 310 square pixels is greater than the obscurity threshold of 200 square pixels, the control point filtering system 210 surfaces the control point corresponding to the unobscured bounding shape of 310 square pixels. On the contrary, if the obscurity threshold were 400 square pixels, the control point filtering system 210 in one or more implementations at act 418 would exclude (from display) the control point corresponding to the unobscured bounding shape of 310 square pixels based on the comparison at act 416.

In excluding a control point from display, the control point filtering system 210 utilizes a variety of approaches. In a first example approach, the control point filtering system 210 hides the excluded control point from display while still temporarily storing the control point. In a second example approach, the control point filtering system 210 deletes or destroys the excluded control point. While the first approach of hiding excluded control points helps to maintain a clutter-free user interface, the second approach of deleting excluded control points helps to free up memory and further improve rendering speed for an implementing computing device.

In these or other embodiments, the control point filtering system 210 iterates and/or simultaneously performs the foregoing acts for other control points to surface the subset of control points and exclude the additional set of control points. For example, the control point filtering system 210 iterates one or more of the foregoing acts to traverse one or more nodes of the three-dimensional data structure. As another example, the control point filtering system 210 iterates one or more of the foregoing acts in response to detecting a modification of one or more control points (e.g., a local modification or a global modification). As another example, the control point filtering system 210 iterates one or more of the foregoing acts in response to generating a new control point or destroying a control point (e.g., as a result of a selection change for the vector object). By dynamically iterating one or more of the foregoing acts, the control point filtering system 210 in one or more embodiments captures and reflects a change in obscurity for control points within the digital canvas (e.g., from obscured to unobscured and vice-versa).

Figure 5C:
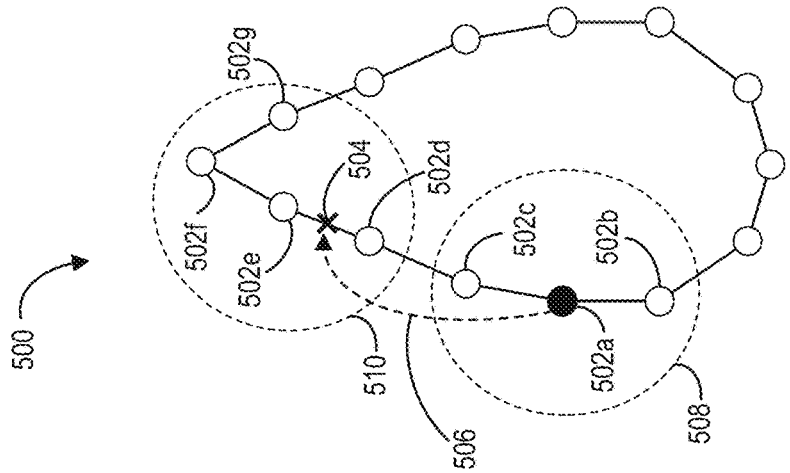
FIGS. 5A-5C illustrate a control point filtering system determining an impact area for a local modification of a control point for a vector object in accordance with one or more embodiments.
Figure 5B:
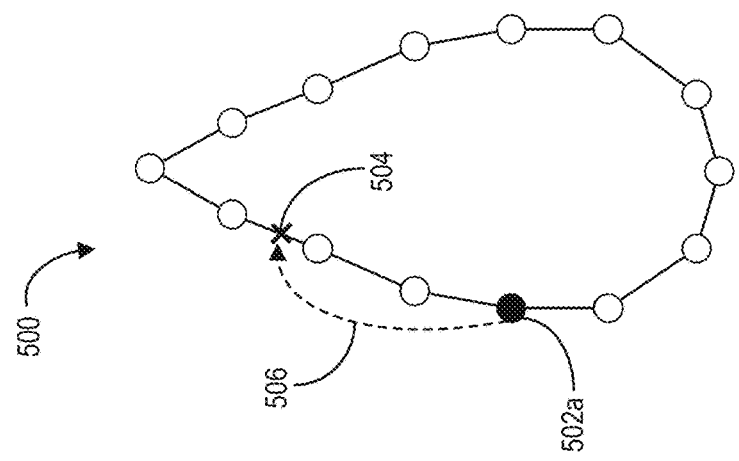
Figure 5A:
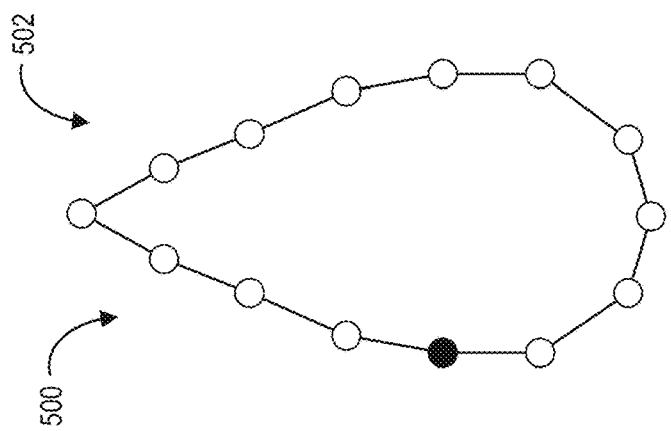

As mentioned above, the control point filtering system 210 in one or more embodiments determines an impact area for limiting obscurity metric evaluations to certain portions of the digital canvas. By limiting obscurity metric evaluations to certain portions of the digital canvas, the control point filtering system 210 further improves computational efficiency in one or more implementations. FIGS. 5A-5C illustrate the control point filtering system 210 determining an impact area for a local modification of a control point for a vector object 500 in accordance with one or more embodiments.

As shown in FIG. 5A, the control point filtering system 210 provides for display a subset of control points 502 for the vector object 500. In particular, and as described above, the control point filtering system 210 in certain implementations surfaces the subset of control points 502 after a dynamic screening process. For example, the control point filtering system 210 generates a set of control points for the vector object 500 with corresponding bounding shapes in response to detecting a user selection of the vector object 500. In turn, the control point filtering system 210 compares coordinate positions and control orders of the bounding shapes utilizing a three-dimensional data structure to determine obscurity metrics for control points. Based on the subset of control points 502 satisfying an obscurity threshold, FIG. 5A depicts the control point filtering system 210 having surfaced the subset of control points 502.

Subsequently, FIG. 5B illustrates the control point filtering system 210 receiving an indication of a user interaction to modify a control point 502a for the vector object 500 by moving the control point 502a to an updated position 504 along a drag route 506. In response to detecting the indication of the user interaction, the control point filtering system 210 implements one or more dynamic responses discussed below in relation to FIG. 5C.

As shown, FIG. 5C illustrates the control point filtering system 210 determining impact areas 508, 510 that correspond to the modification of moving the control point 502a to the updated position 504 on the vector object 500. In these or other embodiments, an impact area includes a region of a digital canvas affected by a modification of a control point. In particular embodiments, an impact area includes an entirety of the digital canvas for global modifications (e.g., panning operations, zooming operations, etc.). In other embodiments, impact areas for a local modification. For example, a drag operation generally includes a series of local, discrete movements within a digital canvas. Each movement within this series of discrete movements can include two impact areas of the digital canvas, namely a first impact area for the beginning of each movement and a second impact area at the end of each movement. Generally, the second impact area for any particular movement is the first impact area for a subsequent movement in the series.

For illustration purposes, the example embodiment of FIG. 5 treats a drag operation as a single movement. It will be appreciated that the control point filtering system 210 can repeat the processes described below for multiple movements in a series of discrete movements making up a drag operation. Moreover, as described below, in some implementations, the control point filtering system 210 utilizes a batch operation at the conclusion of a drag operation to reduce the number of intermediate computations during a drag operation.

For instance, the first impact area in some embodiments comprises a region of the digital canvas occupied by a bounding shape of the control point prior to being modified (e.g., a region around a starting position of a particular movement in a series of movements). Similarly, for instance, the second impact area in some embodiments comprises a region of the digital canvas occupied by the bounding shape of the control point after being modified (e.g., the end position of a particular movement in a series of movements). In some embodiments, the first and second impact areas include a threshold area (e.g., pixel radius) of the digital canvas proximate to the control point prior to and after modification.

To determine the impact areas 508, 510, the control point filtering system 210 can utilize a variety of different methods. For example, in one or more embodiments, the control point filtering system 210 determines a respective threshold pixel radius (e.g., 100 pixels, 500 pixels, 1000 pixels, etc.) around the control point 502a (pre-modification) and the updated position 504. For example, the control point filtering system 210 can utilize user settings and/or system settings to implement a configurable pixel radius. Additionally or alternatively, the control point filtering system 210 determines the threshold pixel radius based on a display resolution of an implementing computing device.

As another example, in one or more embodiments, the control point filtering system 210 determines the impact area 508 based on a bounding shape of the control point 502 (e.g., the bounding shape prior to moving the control point 502a). In addition, the control point filtering system 210 determines the impact area 510 based on the bounding shape of the control point 502a at the updated position 504. Thus, in some embodiments, the impact areas 508, 510 correspond to areas covered by the bounding shape of the control point 502a before modification and after modification.

As shown in FIG. 5C, the control point filtering system 210 further identifies the control points that correspond to the impact areas 508, 510. To determine which of the subset of control points 502 correspond to the impact areas 508, 510, the control point filtering system 210 identifies which control points overlap and/or reside entirely within a boundary for the impact areas 508, 510. In this manner, the control point filtering system 210 identifies a first set of control points positioned proximate to the control point 502a prior to the modification and a second set of control points positioned proximate to the control point 502a following the modification. For instance, according to FIG. 5C, the control point filtering system 210 in one or more embodiments determines that control points 502b-502c correspond to the impact area 508 and that control points 502d-502g correspond to the impact area 510.

Further, albeit not shown in FIG. 5C, the control point filtering system 210 in one or more embodiments identifies hidden control points specific to the impact area 508 that correspond to control points that were previously too obscured for displaying with the subset of control points 502. Similarly, in some embodiments, the control point filtering system 210 re-generates control points within the impact area 508 that were previously destroyed (i.e., deleted) for being too obscured for display with the subset of control points 502. In this manner, the control point filtering system 210 can re-determine whether to show any of the control points previously considered but excluded for display with the subset of control points 502.

Thus, in some embodiments, the control point filtering system 210 only updates obscurity metrics for the control points identified within the impact areas 508, 510 in response to the modification for moving the control point 502a to the updated position 504. In this manner, the control point filtering system 210 can significantly reduce computational overhead. Moreover, in some embodiments, the control point filtering system 210 need not update obscurity metrics for all of the identified control points within the impact areas 508, 510. Indeed, in some embodiments the control point filtering system 210 only reevaluates some (or none) of the identified control points. For example, utilizing the three-dimensional data structure, the control point filtering system 210 can analyze only those control points within the impact areas 508, 510 that have a lower control order than the control point 502a.

Indeed, as described above, the control point filtering system 210 determines obscurity metrics based on overlapping areas of bounding shapes with higher control orders than a reference control point. Accordingly, when a control point moves, the control point filtering system 210 does not need to re-evaluate control points with higher control orders. In some embodiments, the control point filtering system 210 only analyzes those control points having lower control orders. Thus, in relation to FIG. 5C, the control point filtering system 210 determines which of the identified control points within the impact areas 508, 510 correspond to a lower control order than associated with the control point 502a. Because modification of the control point 502a only affects control points associated with lower control orders, the control point filtering system 210 targets these control points within the impact areas 508, 510 for generating updated obscurity metrics.

Based on one or more updated obscurity metrics for the identified control points within the impact areas 508, 510, the control point filtering system 210 provides an additional subset of control points for display. In some embodiments, the additional subset of control points includes additional control points that were not part of the subset of control points 502 originally provided for display. In additional or alternative embodiments, the additional subset of control points includes a portion of the subset of control points 502 (i.e., fewer of the same control points 502). Still, in other embodiments, the additional subset of control points includes the exact same subset of control points 502.

As mentioned above, in some embodiments the control point filtering system 210 utilizes batch processing to surface a set of control points. For example, the control point filtering system 210 utilizes batch processing to update the impact areas 508, 510 to display an additional subset of control points from the vector object 500. With batch processing, the control point filtering system 210 performs multiple (e.g., bulk) operations at a given time. To illustrate, in one or more implementations, the control point filtering system 210 defers multiple obscurity metric evaluations (or reevaluations) until after the modification is performed. Moreover, by deferring or delaying obscurity metric determinations until a modification is complete, the control point filtering system 210 maintains a positive user experience by preventing a control point being modified or disappearing during the modification.

For example, as the control point 502a moves along the drag route 506, the control point filtering system 210 in one or more implementations does not update the obscurity metric for the control point 502a or the control points 502c-502d (among others) that are near the drag route 506. This approach is particularly advantageous if one or more of the control points 502c-502d (among others) that are near the drag route 506 are associated with a higher control order than the control point 502a. In this case, were obscurity metrics evaluated during the modification, then the control point filtering system 210 may exclude (from being displayed) the control point 502a due to other control points obscuring the control point 502a. To avoid this potentially frustrating user experience, the control point filtering system 210 withholds processing updated obscurity metrics until detecting completion of the modification (e.g., a release of the control point 502a at the updated position 504). At that time, the control point filtering system 210 updates obscurity metrics all at once within the impact areas 508, 510 as discussed above.

In other embodiments, the control point filtering system 210 continually updates (or at predetermined time/distance intervals) obscurity metrics during modification of a control point. For example, in some embodiments, the control point filtering system 210 updates obscurity metrics at intermediate impact areas along the drag route 506 between a location for the control point 502a pre-modification and the updated position 504 post-modification. In this example, the control point filtering system 210 iteratively identifies intermediate locations along the drag route 506 as new local start points and local stop points that each correspond to an impact area for updating obscurity metrics of control points.

As mentioned above, in some embodiments the control point filtering system 210 also utilizes a cache of unobscured bounding shapes to further reduce computational overhead. Indeed, because the control point filtering system 210 can analyze many of the same bounding shapes when traversing down a particular family of root nodes and child nodes in the three-dimensional data structure (e.g., at a particular impact area) utilizing a cache can significantly improve processing performance.

For example, when determining an obscurity metric for a first control point, the control point filtering system 210 traverses up the three-dimensional data structure to analyze how other bounding shapes of higher control orders overlap a first bounding shape for the first control point. After determining the obscurity metric for the first control point, the control point filtering system 210 moves down the hierarchy of the three-dimensional data structure and determines an obscurity metric for a second control point of a lower control order. Similarly, this iteration involves the control point filtering system 210 traversing up the three-dimensional data structure to analyze how other bounding shapes of higher control orders overlap a second bounding shape for the second control point. The control point filtering system 210 can save computational resources by accessing a cache of unobscured bounding shapes to avoid reprocessing the bounding shapes of higher control orders already processed for the first control point.

Figure 6:
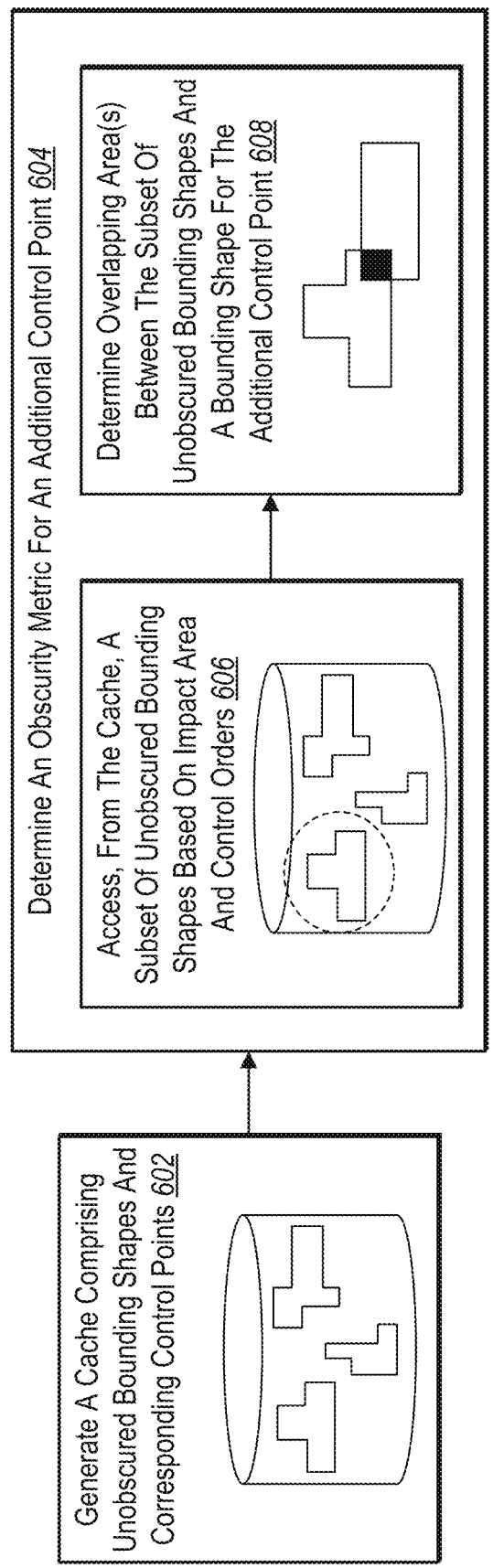
FIG. 6 illustrates a control point filtering system determining an obscurity metric for a control point utilizing a cache of unobscured bounding shapes in accordance with one or more embodiments.

FIG. 6 illustrates the control point filtering system 210 determining an obscurity metric for a control point utilizing a cache of unobscured bounding shapes in accordance with one or more embodiments. As shown in FIG. 6, the control point filtering system 210 performs an act 602 of generating a cache comprising unobscured bounding shapes and corresponding control points (e.g., based on determining an obscurity metric for one or more control points). The unobscured bounding shapes (identified as described above in relation to the act 412 of FIG. 4B) include the net resulting bounding shape after subtracting or removing portions obscured by one or more other bounding shapes (e.g., of higher control orders than the first control order). Upon identifying the unobscured bounding shapes, the control point filtering system 210 temporarily stores the unobscured bounding shapes in a cache.

In these or other embodiments, a cache includes data storage via one or more memory devices. In particular embodiments, a cache includes at least a portion of a memory device or data storage designated for storing unobscured bounding shapes and corresponding control points. For example, in certain embodiments, a cache includes random access memory, cloud storage, and/or other types of accessible memory for implementing computing devices as explained more in relation to FIG. 10.

As shown in FIG. 6, the control point filtering system 210 also performs an act 604 of determining an obscurity metric for an additional control point. To do so, the control point filtering system 210 performs an act 606. Specifically, the control point filtering system accesses, from the cache, a subset of unobscured bounding shapes based on impact area and control orders. For example, the control point filtering system traverses the cache and identifies previously determining unobscured shapes for one or more other control points. In these or other embodiments, the control point filtering system 210 identifies the subset of unobscured bounding shapes based on an identified impact area and/or control orders for the unobscured bounding shapes. Specifically, the control point filtering system 210 only searches the cache within the impact area and at control orders higher than a specific control point.

To illustrate, in some embodiments, the control point filtering system 210 identifies an impact area corresponding to a modification of a singular control point (e.g., the additional control point) associated with a first control order as described above in relation to FIGS. 5A-5C. To determine the obscurity metric for the singular control point, the control point filtering system 210 accesses, from the cache, a subset of unobscured bounding shapes that correspond to the impact area and are associated with higher control orders than the first control order. For instance, the control point filtering system 210 determines the unobscured bounding shapes of higher control occupying a portion of a threshold pixel radius around the singular control point and/or a portion of a same x-value range and y-value range as a bounding shape for the singular control point.

In another example unrelated to a particular modification of control points and/or impact area, the control point filtering system 210 determines an obscurity metric for a second control point (e.g., the additional control point) after determining an obscurity metric for a first control point. In this example, the second control point is associated with a lower control order than a first control order associated with the first control point. Thus, to determine the obscurity metric for the second control point, the control point filtering system 210 accesses, from the cache, a subset of unobscured bounding shapes associated with higher control orders than the first control order.

As shown in FIG. 6, the control point filtering system 210 also performs an act 608 of determining overlapping area(s) between the subset of unobscured bounding shapes and a bounding shape for the additional control point. For example, as described above in relation to the act 410 of FIG. 4B, the control point filtering system 210 determines the overlapping areas for the bounding shape of the additional control point as corresponding to overlapping x-value ranges and overlapping y-value ranges from one or more of the subset of unobscured bounding shapes. In some embodiments, the control point filtering system 210 utilizes overlapping rectangle(s) of diagonally defined coordinates to determine the overlapping area(s), such as ($x_{overlap\_min}$, $y_{overlap\_min}$) and ($x_{overlap\_max}$, $y_{overlap\_max}$). By accessing unobscured bounding shapes and determining overlapping areas based on the unobscured bounding shapes, the control point filtering system 210 can avoid repeatedly processing higher-order bounding shapes when analyzing the obscurity metrics of lower-power bounding shapes.

Figure 7B:
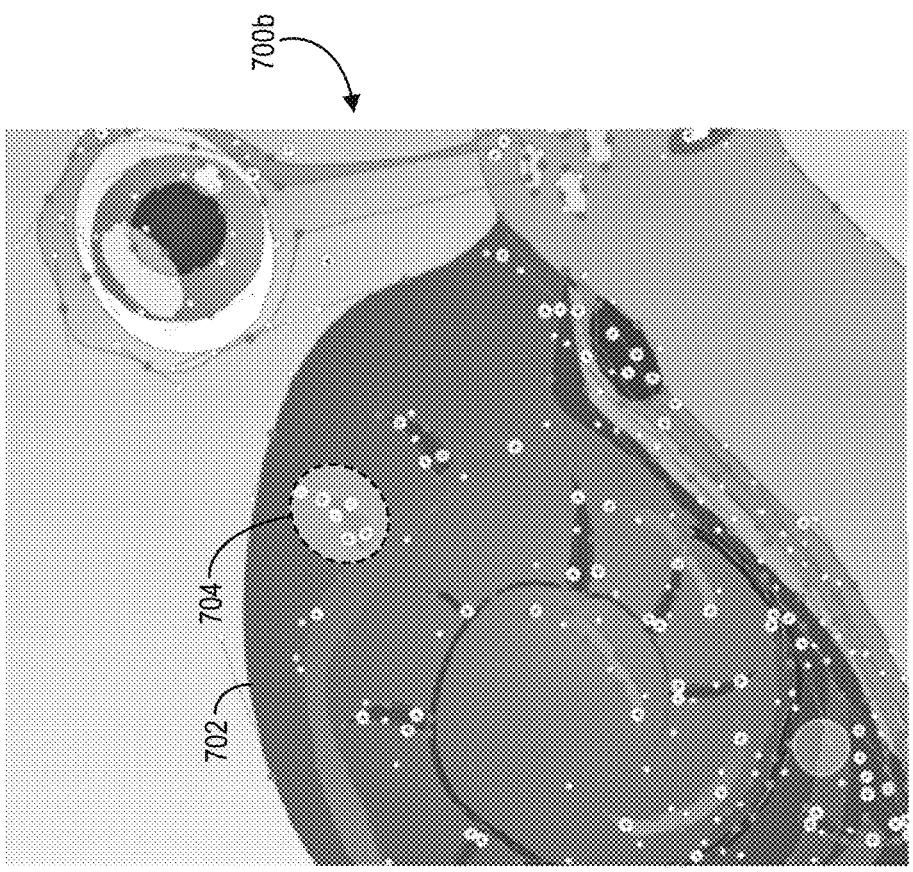
FIGS. 7A-7B illustrate a control point filtering system providing vector objects for display at different zoom levels in accordance with one or more embodiments.
Figure 7A:
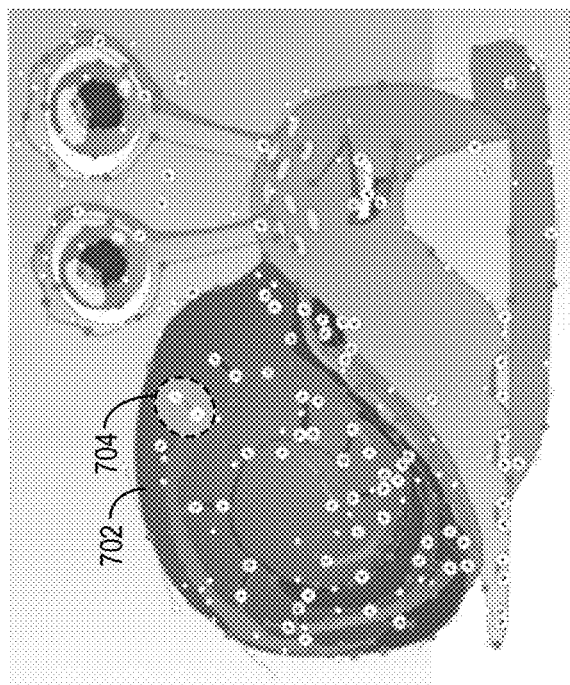

As mentioned above, the control point filtering system 210 dynamically surfaces and/or excludes control points based on modifications. In particular embodiments, the modifications include global modifications such as zoom operations, panning operations, etc. In response to these global modifications, the control point filtering system 210 determines additional obscurity metrics for an additional set of control points and updates an impact area corresponding to an entire digital canvas. FIGS. 7A-7B illustrate the control point filtering system 210 providing respective views of digital canvases 700a-700b with a vector object 702 in accordance with one or more embodiments. Although not illustrated on implementing computing devices, the digital canvases 700a-700b correspond to respective user interfaces of a computing device as described above.

As shown in FIG. 7A, the control point filtering system 210 provides, for display, the vector object 702 at a 200% zoom level. In these or other embodiments, a zoom level includes a viewing perspective on a client device. In particular embodiments, a zoom level includes an amount of window magnification or demagnification for viewing or interacting with a vector object in a digital canvas. For example, FIG. 7A shows the vector object 702 at the 200% zoom level while FIG. 7B shows the vector object 702 at a 400% zoom level.

Additionally shown in FIG. 7A, the control point filtering system 210 provides for display within the digital canvas 700a a subset of control points as a result of determining obscurity metrics for a set of control points (e.g., as described above in relation to the foregoing figures). In particular, the control point filtering system 210 surfaces the subset of control points shown in FIG. 7A and excludes an additional subset of control points (not shown). For example, as shown in a region 704 of the vector object 702, the control point filtering system 210 surfaces two discrete control points.

Subsequently, in response to detecting a user interaction to modify the zoom level, the control point filtering system 210 in one or more embodiments identifies a new zoom level for the digital canvas 700a. For example, as shown in FIG. 7B and responsive to the zoom level modification, the control point filtering system 210 dynamically updates the digital canvas 700a to show the digital canvas 700b reflecting the vector object 702 with an increased number of control points. Because the digital canvas 700b shows the vector object increased to the 400% zoom level, the control point filtering system 210 dedicates more of the digital canvas 700b to a portion of the vector object 702. Accordingly, the control point filtering system 210 utilizes the increased space within the digital canvas to show more control points for the vector object 702. For example, in the region 704 of FIG. 7B, the control point filtering system 210 surfaces six discrete control points in comparison to the two control points shown for the same region 704 in FIG. 7A.

To show the digital canvas 700b as illustrated in FIG. 7B, the control point filtering system 210 in one or more embodiments determines additional obscurity metrics for an additional set of control points based on the new zoom level. In some embodiments, the additional set of control points includes some of the same control points shown in the digital canvas 700a. Additionally, in some embodiments, the additional set of control points includes one or more control points previously excluded from the digital canvas 700a for being too obscured.

With respect to the control points previously excluded from the digital canvas 700a, in these or other embodiments, the control point filtering system 210 identifies certain hidden control points. Specifically, in one or more implementations the control point filtering system 210 identifies hidden control points that correspond to an impact area defined by the metes and bounds of the digital canvas 700b in relation to the vector object 702. Similarly, in some embodiments, the control point filtering system 210 re-generates (within the same impact area) any control points that were previously destroyed (i.e., deleted) within the impact area for being too obscured for display in the digital canvas 700a.

By identifying the additional set of control points as just described, the control point filtering system 210 can re-determine whether to show any of the control points previously considered but excluded for display within the digital canvas 700a. To determine which control points of the additional set of control points to display in the digital canvas 700b, the control point filtering system 210 determines additional obscurity metrics in one or more embodiments. Although determining obscurity metrics as described above generally apply here in a similar manner, the control point filtering system 210 in one or more embodiments accounts for the zoom modification in a variety of ways.

For example, in some embodiments, the control point filtering system 210 maintains a fixed size ratio for control points such that a size of a control point adjusts to the zoom level. Accordingly, in this example, the control point filtering system 210 determines, based on the 400% zoom level, new respective bounding shapes (e.g., new sizes of bounding shapes) for each of the additional set of control points to account for the adjusted control-point sizes. By applying bounding shapes of new sizes, the control point filtering system 210 can determine that previously obscured shapes should now be revealed.

Additionally or alternatively, in some embodiments, the control point filtering system 210 redefines a coordinate system according to the metes and bounds of the digital canvas 700b. Accordingly, in some embodiments, the control point filtering system 210 redetermines x-y coordinate positions of bounding shapes for the additional set of control points within the redefined coordinate system. By analyzing these new positions, the control point filtering system 210 can determine that previously obscured shapes should now be revealed.

Indeed, from the determined bounding shapes for the additional set of control points, the control point filtering system 210 determines additional obscurity metrics for the additional set of control points. As described above in relation to the foregoing figures, the control point filtering system 210 then compares the additional obscurity metrics to an obscurity threshold. Based on those of the additional obscurity metrics satisfying a threshold obscurity, the control point filtering system 210 in one or more embodiments selects an updated subset of the control points to provide for display within the digital canvas 700b.

Although FIGS. 7A-7B illustrate a zoom operation to increase the zoom level for the digital canvas, the control point filtering system 210 in one or more embodiments also performs the same or similar acts described above for zoom operations to decrease a zoom level, panning operations, etc. For example, with respect to decreasing a zoom level, the control point filtering system 210 utilizes a decrease in space within the digital canvas to show fewer control points for the vector object 702. For example, in response to a modification of the zoom level from 400% to 200%, the control point filtering system 210 surfaces two discrete control points for the region 704 (as shown in FIG. 7A) in comparison to the six control points shown for the same region 704 in FIG. 7B. Thus, based on determining additional obscurity metrics for the additional set of control points responsive to a decreased zoom level, the control point filtering system 210 in one or more embodiments selects an updated subset of the control points (e.g., fewer control points) to provide for display.

Furthermore, the control point filtering system 210 in one or more embodiments performs the same or similar acts described above to determine additional obscurity metrics for an additional set of control points based on a new viewing window corresponding to a pan operation. For example, like a new viewing window for modified zoom level, the new viewing window in a pan operation corresponds to additional or alternative portions of the vector object in the digital canvas. Thus, in response to a panning operation to translate a viewing window of the digital canvas, the control point filtering system 210 identifies an additional set control points in a same or similar manner as described above. Based on generating new/updated bounding shapes for the additional set of control points as also described above, the control point filtering system 210 further determines additional obscurity metrics for selecting an updated subset of the control points to display.

Figure 8:
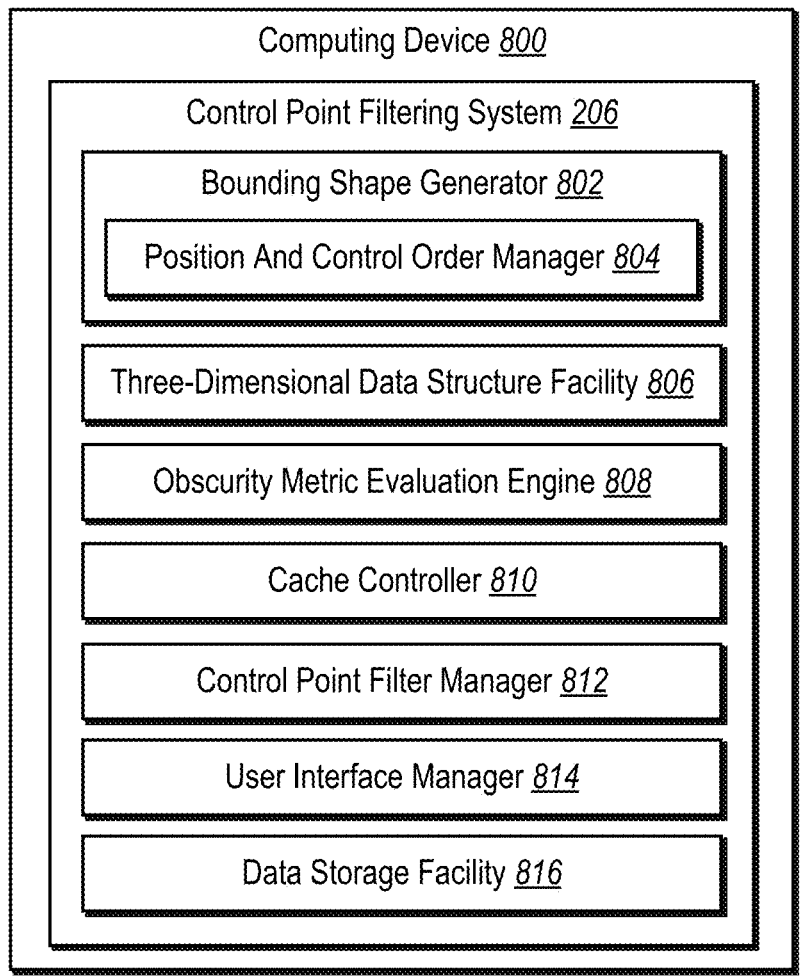
FIG. 8 illustrates an example schematic diagram of a control point filtering system in accordance with one or more embodiments.

Turning to FIG. 8, additional detail will now be provided regarding various components and capabilities of the control point filtering system 210. In particular, FIG. 8 illustrates an example schematic diagram of a computing device 800 (e.g., the client device 100, the server(s) 202, the client device 206) implementing the control point filtering system 210 in accordance with one or more embodiments of the present disclosure. As shown, the control point filtering system 210 in one or more embodiments includes a bounding shape generator 802, a three-dimensional data structure facility 806, an obscurity metric evaluation engine 808, a cache controller 810, a control point filter manager 812, a user interface manager 814, and a data storage facility 816.

The bounding shape generator 802 applies bounding shapes to control points (as described in relation to the foregoing figures). In particular embodiments, the bounding shape generator 802 generates bounding shapes that fully encompass control points formulated in response to a user selection and/or a local/global modification of one or more control points. For example, the bounding shape generator 802 in certain implementations applies a rectangular bounding box around the control points for the control point filtering system 210 to subsequently determine obscurity metrics of control points.

Additionally shown, the bounding shape generator 802 comprises a position and control order manager 804. In these or other embodiments, the position and control order manager 804 determines x-y coordinate positions of bounding shapes and assigns control orders of bounding shapes (as described in relation to the foregoing figures). In particular embodiments, the position and control order manager 804 determines x-value ranges and y-value ranges of the bounding shapes (e.g., by identifying diagonally positioned corners of the bounding shape within a coordinate system). Additionally, in some embodiments, the position and control order manager 804 determines control orders for bounding shapes to indicate an assigned depth configuration. For instance, the position and control order manager 804 determines control orders for bounding shapes based on an order of creation for each control point.

The three-dimensional data structure facility 806 populates and stores the positions and control orders of bounding shapes and corresponding control points. In particular embodiments, the three-dimensional data structure facility 806 arranges bounding shapes into root nodes and child nodes based on the positions and control orders of the bounding shapes. For example, the three-dimensional data structure facility 806 arranges a first bounding shape as a root node that at least partially overlaps a second bounding shape (e.g., the child node) and has a higher control order than the second bounding shape.

The obscurity metric evaluation engine 808 determines obscurity metrics for control points (as described in relation to the foregoing figures). In particular embodiments, the obscurity metric evaluation engine 808 determines obscurity metrics for control points by comparing the positions and the control orders of the bounding shapes utilizing the three-dimensional data structure. For example, the obscurity metric evaluation engine 808 removes overlapping portions from the bounding shapes of lower control orders to determine unobscured areas of the bounding shapes.

In these or other embodiments, the cache controller 810 generates a cache comprising unobscured bounding shapes and corresponding control points (as described in relation to the foregoing figures). In particular embodiments, the cache controller 810 coordinates with the obscurity metric evaluation engine 808 for determining an obscurity metric for a control point based on the cache of unobscured bounding shapes. For example, when determining an obscurity metric for a second control point after determining an obscurity metric for a first control point, the cache controller 810 provides access to the obscurity metric evaluation engine 808 to avoid reprocessing of unobscured bounding shapes previously identified.

The control point filter manager 812 compares obscurity metrics to an obscurity threshold (as described in relation to the foregoing figures). In particular embodiments, the control point filter manager 812 filters out the obscurity metrics failing to satisfy an obscurity threshold. For example, the control point filter manager 812 selects a subset of control points to display within a user interface based on corresponding obscurity metrics satisfying the obscurity threshold. Additionally, for instance, the control point filter manager 812 selects an additional subset of control points to exclude from the user interface based on corresponding obscurity metrics failing to satisfy the obscurity threshold (e.g. for being too obscured).

The user interface manager 814 in one or more embodiments provides, manages, and/or controls a graphical user interface (or simply "user interface"). In particular embodiments, the user interface manager 814 generates and displays a user interface by way of a display screen composed of a plurality of graphical components, objects, and/or elements that allow a user to perform a function. For example, the user interface manager 814 receives user inputs from a user, such as a click/tap to select a vector object, modify a control point, etc. Additionally, the user interface manager 814 in one or more embodiments presents a variety of types of information, including text, digital media items (e.g., vector objects), or other information for presentation in a digital canvas.

The data storage facility 816 maintains data for the control point filtering system 210. The data storage facility 816 (e.g., via one or more memory devices) maintains data of any type, size, or kind, as necessary to perform the functions of the control point filtering system 210. In particular embodiments, the data storage facility 816 coordinates storage mechanisms for other components of the computing device 800 (e.g., for storing position and control orders of bounding shapes, for caching unobscured bounding shapes, etc.).

Each of the components of the computing device 800 can include software, hardware, or both. For example, the components of the computing device 800 can include one or more instructions stored on a computer-readable storage medium and executable by processors of one or more computing devices, such as a client device or server device. When executed by the one or more processors, the computer-executable instructions of the control point filtering system 210 can cause the computing device(s) (e.g., the computing device 800) to perform the methods described herein. Alternatively, the components of the computing device 800 can include hardware, such as a special-purpose processing device to perform a certain function or group of functions. Alternatively, the components of the computing device 800 can include a combination of computer-executable instructions and hardware.

Furthermore, the components of the computing device 800 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 800 may be implemented as a stand-alone application, such as a desktop or mobile application. Furthermore, the components of the computing device 800 may be implemented as one or more web-based applications hosted on a remote server.

The components of the computing device 800 may also be implemented in a suite of mobile device applications or "apps." To illustrate, the components of the computing device 800 may be implemented in an application, including but not limited to ILLUSTRATOR®, ADOBE FRESCO®, PHOTOSHOP®, LIGHTROOM®, ADOBE® XD, or AFTER EFFECTS®. Product names, including "ADOBE" and any other portion of one or more of the foregoing product names, may include registered trademarks or trademarks of Adobe Inc. in the United States and/or other countries.

Figure 9:
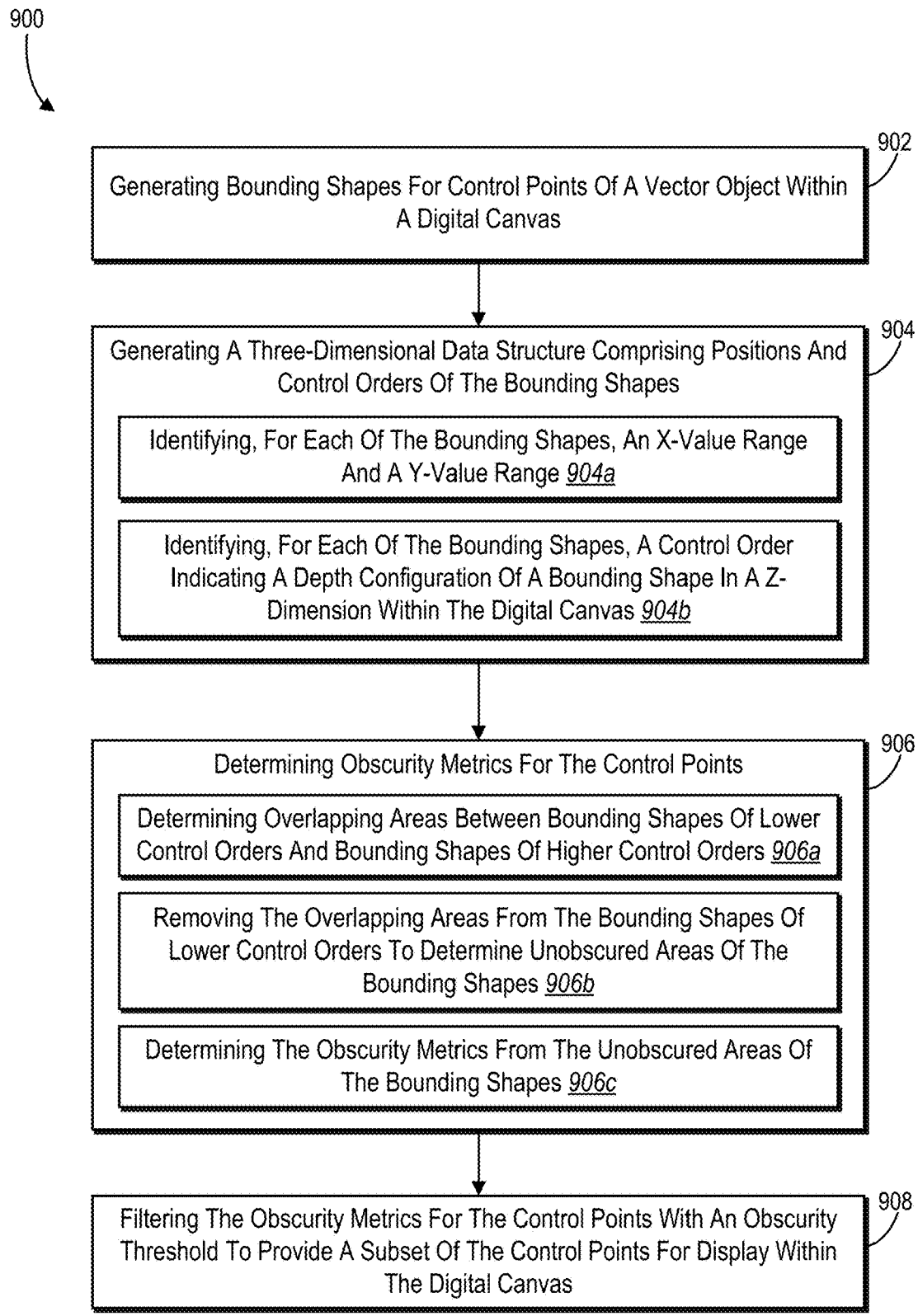
FIG. 9 illustrates a flowchart of a series of acts for filtering control points utilizing obscurity metrics in accordance with one or more embodiments.

FIGS. 1-8, the corresponding text, and the examples provide several different systems, methods, techniques, components, and/or devices of the control point filtering system 210 in accordance with one or more embodiments. In addition to the above description, one or more embodiments can also be described in terms of flowcharts including acts for accomplishing a particular result. For example, FIG. 9 illustrates a flowchart of a series of acts 900 for filtering obscurity metrics for control points in accordance with one or more embodiments. The control point filtering system 210 may perform one or more acts of the series of acts 900 in addition to or alternatively to one or more acts described in conjunction with other figures. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown, the series of acts 900 includes an act 902 of generating bounding shapes for control points of a vector object within a digital canvas. Furthermore, the series of acts 900 includes an act 904 of generating a three-dimensional data structure comprising positions of the bounding shapes within the digital canvas and control orders of the bounding shapes.

For example, act 904 comprises an act 904*a* of identifying, for each of the bounding shapes, a position comprising an x-value range and a y-value range. Additionally, act 904 comprises an act 904*b* of identifying, for each of the bounding shapes, a control order indicating a depth configuration of a bounding shape in a z-dimension within the digital canvas. Further, in some embodiments, act 904 comprises generating the three-dimensional data structure by arranging the bounding shapes into one or more root nodes and one or more child nodes based on the positions and the control orders of the bounding shapes within the digital canvas.

In some embodiments, act 904 of generating a three-dimensional data structure comprises arranging a first bounding shape as a root node based on a first control order of the first bounding shape; and arranging a second bounding shape as a child node to the root node based on: a second control order of the second bounding shape being lower than the first control order; and the first bounding shape and the second bounding shape at least partially overlapping.

In addition, the series of acts 900 includes an act 906 of determining obscurity metrics for the control points. For example, act 906 comprises an act 906*a* of determining overlapping areas between bounding shapes of lower control orders and bounding shapes of higher control orders. Additionally, act 906*b* of the act 906 comprises removing the overlapping areas from the bounding shapes of lower control orders to determine unobscured areas of the bounding shapes. Further, act 906*c* of the act 906 comprises determining the obscurity metrics from the unobscured areas of the bounding shapes.

To illustrate an example with respect to a first bounding shape, determining the obscurity metrics at act 906 comprises: identifying a second bounding shape and a third bounding shape both overlapping the first bounding shape and both having higher control orders than the first bounding shape; and removing, from the first bounding shape, a first overlapping portion corresponding to the second bounding shape and a second overlapping portion corresponding to the third bounding shape.

To illustrate another example with respect to a first bounding shape, determining the obscurity metrics at act 906 comprises: identifying a second bounding shape and a third bounding shape both overlapping the first bounding shape, wherein the second bounding shape has a higher control order than the first bounding shape and the third bounding shape has a lower control order than the first bounding shape; and removing, from the first bounding shape, an overlapping portion corresponding to the second bounding shape without removing an overlapping portion corresponding to the third bounding shape.

In some embodiments, act 906 for determining obscurity metrics of one or more control points comprises: comparing the x-y coordinate positions and the control orders from the three-dimensional data structure to identify a set of unobscured bounding shapes and corresponding control points; and generating a cache comprising the set of unobscured bounding shapes.

Further, in some embodiments, act 906 comprises: identifying an impact area corresponding to a modification of a singular control point associated with a first control order; and determining the obscurity metric for the singular control point by: accessing, from the cache, a subset of unobscured bounding shapes that correspond to the impact area and are associated with higher control orders than the first control order; and determining one or more overlapping areas between the subset of unobscured bounding shapes and a bounding shape of the singular control point.

The series of acts 900 further includes an act 908 of filtering the obscurity metrics for the control points with an obscurity threshold to provide a subset of the control points for display within the digital canvas. In some embodiments, providing the subset of the control points for display comprises providing one or more of: Bezier anchor points, digital handles associated with the Bezier anchor points, or roundedness controls.

It is understood that the outlined acts in the series of acts 900 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 9, act(s) in the series of acts 900 include identifying, via the user interface of the client device, a modification to a singular control point of the subset of the control points provided for display; identify a first set of control points positioned proximate to the singular control point prior to the modification and a second set of control points positioned proximate to the singular control point following the modification; and providing an additional subset of the control points for display by updating the obscurity metrics for the first set of control points and the second set of control points.

As another example of an additional act not shown in FIG. 9, act(s) in the series of acts 900 include removing an additional subset of the control points based on corresponding obscurity metrics satisfying the obscurity threshold. Similarly, in some embodiments, act(s) in the series of acts 900 include excluding an additional subset of the control points based on corresponding obscurity metrics indicating that each bounding shape for the additional subset of the control points comprises less than a threshold area of pixels. Additionally or alternatively, in some embodiments, act(s) in the series of acts 900 include hiding or deleting a second subset of the control points determined to be excluded from the digital canvas.

As a further example of an additional act not shown in FIG. 9, act(s) in the series of acts 900 include generating a cache comprising unobscured bounding shapes and corresponding control points based on determining an obscurity metric for a first control point associated with a first control order; and accessing, from the cache, a subset of unobscured bounding shapes associated with higher control orders than the first control order to determine an obscurity metric for a second control point associated with a lower control order than the first control order.

In yet another example of an additional act not shown in FIG. 9, act(s) in the series of acts 900 include: providing the subset of the control points for display within a user interface of a client device; identifying, via the user interface of the client device, an impact area corresponding to a modification of a singular control point of the subset of the control points provided for display; identifying a set of control points within the impact area associated with bounding shapes having a lower control order than a bounding shape for the singular control point; and updating obscurity metrics for the set of control points identified within the impact area.

As an additional example of an act not shown in FIG. 9, act(s) in the series of acts 900 include: identifying, via a user interface of a client device, a new zoom level for the digital canvas; determining additional obscurity metrics for an additional set of control points based on the new zoom level; and selecting, based on the additional obscurity metrics, an updated subset of the control points to provide for display within the user interface of the client device.

In a particular embodiment of one or more acts not expressly included in the series of acts 900, act(s) in the series of acts 900 include: generating bounding shapes for the control points of the vector object; generating a three-dimensional data structure comprising x-y coordinate positions of the bounding shapes within a digital canvas and control orders indicating an assigned depth configuration of the bounding shapes in a z-dimension; determining, utilizing the three-dimensional data structure, obscurity metrics for the control points by: identifying a first control point having a lower control order within the assigned depth configuration relative to a second control order of a second control point; identifying, an overlapping area between a first bounding shape of the first control point and a second bounding shape of the second control point; and utilizing the overlapping area to determine an obscurity metric for the first control point; and selecting a subset of the control points to provide for display within the digital canvas by comparing the obscurity metrics.

In yet another embodiment of one or more acts not expressly included in the series of acts 900, act(s) in the series of acts 900 include: receiving, via a user interface of a client device, an indication of a user interaction to view or modify control points of a vector object within a digital canvas; generating bounding shapes for the control points of the vector object; generating a three-dimensional data structure comprising positions of the bounding shapes within the digital canvas and control orders of the bounding shapes within the digital canvas; performing a step for determining a first subset of the control points to include within the digital canvas and a second subset of the control points to exclude from the digital canvas; and providing the first subset of the control points for display within the digital canvas via the user interface of the client device.

As just mentioned, in one or more embodiments, act(s) the series of acts 900 include performing a step for determining a first subset of the control points to include within the digital canvas and a second subset of the control points to exclude from the digital canvas. For instance, the acts and algorithms described above in relation to FIG. 3, 4A-4B can comprise the corresponding acts (or structure) for determining a first subset of the control points to include within the digital canvas and a second subset of the control points to exclude from the digital canvas.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
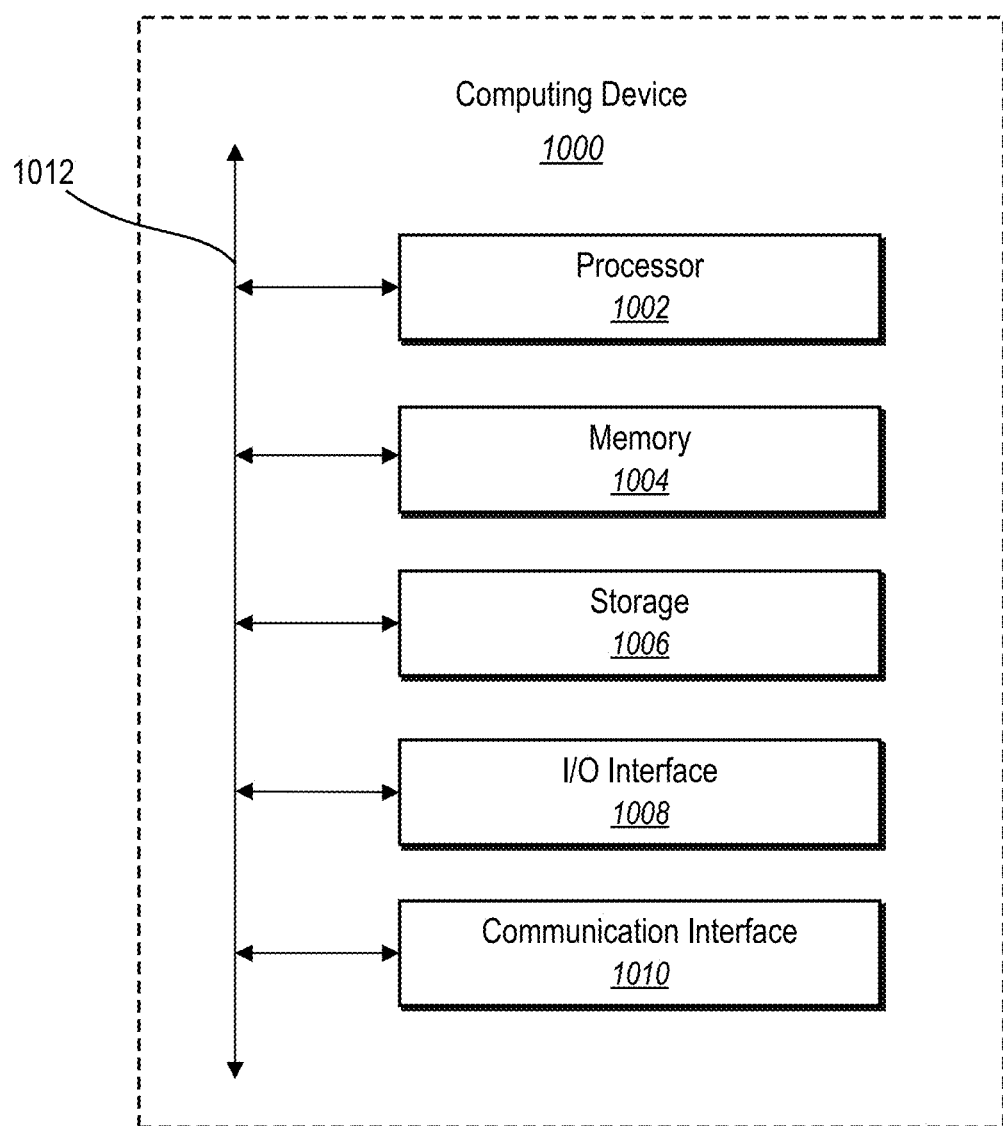
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the client device 100, the server(s) 202, the client device 206, and/or the computing device 800). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of the computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    generate bounding shapes for control points of a vector object within a digital canvas;
    generate a three-dimensional data structure comprising positions of the bounding shapes within the digital canvas and control orders of the bounding shapes;
    determine obscurity metrics for the control points by comparing the positions and the control orders of the bounding shapes utilizing the three-dimensional data structure; and
    filter the obscurity metrics for the control points with an obscurity threshold to provide a subset of the control points for display within the digital canvas via a user interface of a client device.

2. The non-transitory computer-readable medium of claim 1, further comprising instructions that, when executed by the at least one processor, cause the computing device to determine the obscurity metrics for the control points by determining overlapping areas between bounding shapes of lower control orders and bounding shapes of higher control orders.

3. The non-transitory computer-readable medium of claim 2, further comprising instructions that, when executed by the at least one processor, cause the computing device to determine the obscurity metrics by:
    removing the overlapping areas from the bounding shapes of lower control orders to determine unobscured areas of the bounding shapes; and
    determining the obscurity metrics from the unobscured areas of the bounding shapes.

4. The non-transitory computer-readable medium of claim 1, further comprising instructions that, when executed by the at least one processor, cause the computing device to generate the three-dimensional data structure by identifying, for each of the bounding shapes:
    a position comprising an x-value range and a y-value range; and
    a control order indicating a depth configuration of a bounding shape in a z-dimension within the digital canvas.

5. The non-transitory computer-readable medium of claim 1, further comprising instructions that, when executed by the at least one processor, cause the computing device to generate the three-dimensional data structure by arranging the bounding shapes into one or more root nodes and one or more child nodes based on the positions and the control orders of the bounding shapes within the digital canvas.

6. The non-transitory computer-readable medium of claim 1, further comprising instructions that, when executed by the at least one processor, cause the computing device to:
    identify, via the user interface of the client device, a modification to a singular control point of the subset of the control points provided for display;
    identify a first set of control points positioned proximate to the singular control point prior to the modification and a second set of control points positioned proximate to the singular control point following the modification; and
    providing an additional subset of the control points for display by updating the obscurity metrics for the first set of control points and the second set of control points.

7. The non-transitory computer-readable medium of claim 1, further comprising instructions that, when executed by the at least one processor, cause the computing device to remove an additional subset of the control points based on corresponding obscurity metrics satisfying the obscurity threshold.

8. The non-transitory computer-readable medium of claim 1, further comprising instructions that, when executed by the at least one processor, cause the computing device to determine the obscurity metrics for a first bounding shape by:
    identifying a second bounding shape and a third bounding shape both overlapping the first bounding shape and both having higher control orders than the first bounding shape; and
    removing, from the first bounding shape, a first overlapping portion corresponding to the second bounding shape and a second overlapping portion corresponding to the third bounding shape.

9. The non-transitory computer-readable medium of claim 1, further comprising instructions that, when executed by the at least one processor, cause the computing device to determine the obscurity metrics for a first bounding shape by:
    identifying a second bounding shape and a third bounding shape both overlapping the first bounding shape, wherein the second bounding shape has a higher control order than the first bounding shape and the third bounding shape has a lower control order than the first bounding shape; and
    removing, from the first bounding shape, an overlapping portion corresponding to the second bounding shape without removing an overlapping portion corresponding to the third bounding shape.

10. The non-transitory computer-readable medium of claim 1, further comprising instructions that, when executed by the at least one processor, cause the computing device to:
generate a cache comprising unobscured bounding shapes and corresponding control points based on determining an obscurity metric for a first control point associated with a first control order; and
access, from the cache, a subset of unobscured bounding shapes associated with higher control orders than the first control order to determine an obscurity metric for a second control point associated with a lower control order than the first control order.

11. A system comprising:
one or more memory devices comprising a vector object having control points; and
one or more computing devices configured to cause the system to:
generate bounding shapes for the control points of the vector object;
generate a three-dimensional data structure comprising x-y coordinate positions of the bounding shapes within a digital canvas and control orders indicating an assigned depth configuration of the bounding shapes in a z-dimension;
determine, utilizing the three-dimensional data structure, obscurity metrics for the control points by:
identifying a first control point having a lower control order within the assigned depth configuration relative to a second control order of a second control point;
identifying, an overlapping area between a first bounding shape of the first control point and a second bounding shape of the second control point; and
utilizing the overlapping area to determine an obscurity metric for the first control point; and
select a subset of the control points to provide for display within the digital canvas by comparing the obscurity metrics.

12. The system of claim 11, wherein the one or more computing devices are configured to cause the system to:
provide the subset of the control points for display within a user interface of a client device;
identify, via the user interface of the client device, an impact area corresponding to a modification of a singular control point of the subset of the control points provided for display;
identify a set of control points within the impact area associated with bounding shapes having a lower control order than a bounding shape for the singular control point; and
update obscurity metrics for the set of control points identified within the impact area.

13. The system of claim 11, wherein the one or more computing devices are configured to cause the system to:
identify, via a user interface of a client device, a new zoom level for the digital canvas;
determine additional obscurity metrics for an additional set of control points based on the new zoom level; and
select, based on the additional obscurity metrics, an updated subset of the control points to provide for display within the user interface of the client device.

14. The system of claim 11, wherein the one or more computing devices are configured to cause the system to determine the obscurity metrics for one or more of the control points by:
comparing the x-y coordinate positions and the control orders from the three-dimensional data structure to identify a set of unobscured bounding shapes and corresponding control points; and
generating a cache comprising the set of unobscured bounding shapes.

15. The system of claim 14, wherein the one or more computing devices are configured to cause the system to determine the obscurity metrics for one or more of the control points by:
identifying an impact area corresponding to a modification of a singular control point associated with a first control order; and
determining the obscurity metric for the singular control point by:
accessing, from the cache, a subset of unobscured bounding shapes that correspond to the impact area and are associated with higher control orders than the first control order; and
determining one or more overlapping areas between the subset of unobscured bounding shapes and a bounding shape of the singular control point.

16. The system of claim 11, wherein the one or more computing devices are configured to exclude an additional subset of the control points based on corresponding obscurity metrics indicating that each bounding shape for the additional subset of the control points comprises less than a threshold area of pixels.

17. A computer-implemented method comprising:
receiving, via a user interface of a client device, an indication of a user interaction to view or modify control points of a vector object within a digital canvas;
generating bounding shapes for the control points of the vector object;
generating a three-dimensional data structure comprising positions of the bounding shapes within the digital canvas and control orders of the bounding shapes within the digital canvas;
performing a step for determining a first subset of the control points to include within the digital canvas and a second subset of the control points to exclude from the digital canvas; and
providing the first subset of the control points for display within the digital canvas via the user interface of the client device.

18. The computer-implemented method of claim 17, further comprising hiding or deleting the second subset of the control points determined to be excluded from the digital canvas.

19. The computer-implemented method of claim 17, wherein generating the three-dimensional data structure comprises:
arranging a first bounding shape as a root node based on a first control order of the first bounding shape; and
arranging a second bounding shape as a child node to the root node based on:
a second control order of the second bounding shape being lower than the first control order; and
the first bounding shape and the second bounding shape at least partially overlapping.

20. The computer-implemented method of claim 17, wherein providing the first subset of the control points for display comprises providing one or more of: Bezier anchor points, digital handles associated with the Bezier anchor points, or roundedness controls.

* * * * *